United States Patent [19]
Knight

[11] Patent Number: 5,296,861
[45] Date of Patent: Mar. 22, 1994

[54] METHOD AND APPARATUS FOR MAXIMUM LIKELIHOOD ESTIMATION DIRECT INTEGER SEARCH IN DIFFERENTIAL CARRIER PHASE ATTITUDE DETERMINATION SYSTEMS

[75] Inventor: Donald T. Knight, San Pedro, Calif.
[73] Assignee: Trimble Navigation Limited, Sunnyvale, Calif.
[21] Appl. No.: 976,174
[22] Filed: Nov. 13, 1992
[51] Int. Cl.$^5$ ............................ H04B 7/185; G01S 5/02
[52] U.S. Cl. ........................................................ 342/357
[58] Field of Search ................. 342/357, 442, 446, 451

[56] References Cited

U.S. PATENT DOCUMENTS

| | | | |
|---|---|---|---|
| 3,772,701 | 11/1973 | Wilkinson | 343/100 CS |
| 3,935,574 | 1/1976 | Pentheroudakis | 342/424 |
| 4,232,313 | 11/1980 | Fleishman | 343/6 R |
| 4,418,350 | 11/1983 | Rosen | 343/359 |
| 4,644,358 | 2/1987 | Sekine | 342/356 |
| 4,741,245 | 5/1988 | Malone | 89/41.03 |
| 4,796,032 | 1/1989 | Sakurai et al. | 342/359 |
| 4,812,991 | 3/1989 | Hatch | 364/458 |
| 4,870,422 | 9/1989 | Counselman, III | 342/357 |
| 4,881,080 | 11/1989 | Jablonski | 342/357 |
| 4,949,089 | 8/1990 | Ruszkowski | 342/52 |
| 4,954,833 | 9/1990 | Evans et al. | 342/357 |
| 4,963,889 | 10/1990 | Hatch | 342/357 |
| 4,990,922 | 2/1991 | Young et al. | 342/52 |
| 4,994,812 | 2/1991 | Uematsu et al. | 342/359 |

OTHER PUBLICATIONS

Cohen and Parkinson, "Mitigating Multipath in GPS Based Attitude Determination," paper at 14th AAS Guidance and Control Conference, Feb. 2–6, 1991, Keystone, Colo.
Ron Brown, "A GPS Receiver with Built-In Precision Pointing Capability," paper at the IEEE Position Location and Navigation Symposium (PLANS '90) Las Vegas, Nev., Mar. 1990.
Rath and Ward, "Attitude Estimation Using GPS," ION National Technical Meeting, San Mateo, Calif. Jan. 1989.
Nesbo and Canter, "GPS Attitude Determination for Navigation," *GPS World*, Sep./Oct. 1990, pp. 36–41.
Patrick Hwang, "A Near-Instantaneous Initialization Method for Attitude Determination," unknown publication, pp. 661–669.
Ferguson et al., "Three-Dimensional Attitude Determination with the Ashtech 3DF 24-Channel GPS Measurement System," unknown pub.
Keierleber et al., "Attitude Determination for Space Transfer Vehicles Using GPS," unknown pub.
Satz et al., "GPS Inertial Attitude Estimation via Carrier Acc . . . ," paper at Institute of Navigation (ION), National Technical Meeting, Phoenix, Ariz., Jan. 22, 1991.
Ron Hatch, "Instantaneous Ambiguity Resolution," paper presented at KIS Symp., Banff, Canada Sep. 1990.
Ron Hatch, "Ambiguity Resolution in the Fast Lane," unknown pub., pp. 45–50.
Burgett, et al., "The Devel. and Apps. of GPS Determined Attitude," paper for NTC '83, Nov. 1983.

*Primary Examiner*—Theodore M. Blum
*Attorney, Agent, or Firm*—Thomas E. Schatzel

[57] ABSTRACT

A method for comparing the relative phase of carrier signals received from GPS satellites to determine the roll, pitch and azimuth attitude of ships, aircraft, land vehicles, or survey instruments, accomplishes a maximum likelihood estimation (MLE) optimum solution over the full range of integers and vehicle attitudes. The problem is formulated as an MLE optimization, where vehicle attitude and integers are regarded as parameters to be adjusted to maximize probability of first-difference carrier phase measurements that are actually generated by hardware. Formulation results in weighted-fit error W as the objective criterion to minimize. A Kalman filter is introduced, having same objective criterion. Minimizing computation in Kalman filter leads to a decision tree for the integers. Two ways are shown to prune decision tree. The first is to exclude impossible combinations, such as those that produce an antenna upside down. The second is to generate a lower bound for W at each branch of the tree. A running sum is kept at each stage moving down the tree. When that sum exceeds a reasonableness bound or the current best W found elsewhere in the search, it is guaranteed that all subsequent integer combinations further down the current branch will produce a larger W and the remainder of the current branch can be cut off, speeding up the search.

7 Claims, 5 Drawing Sheets

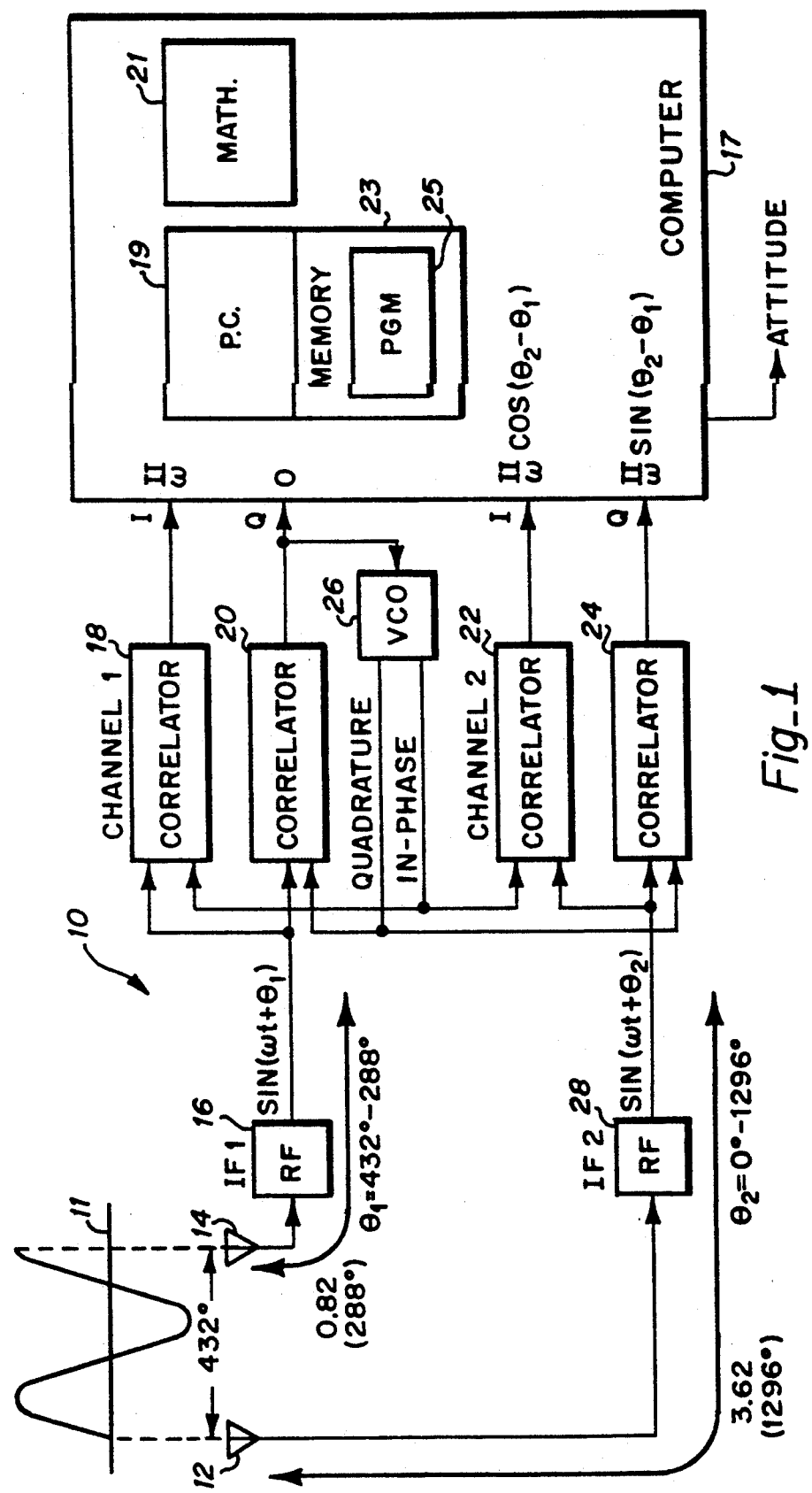
Fig_1

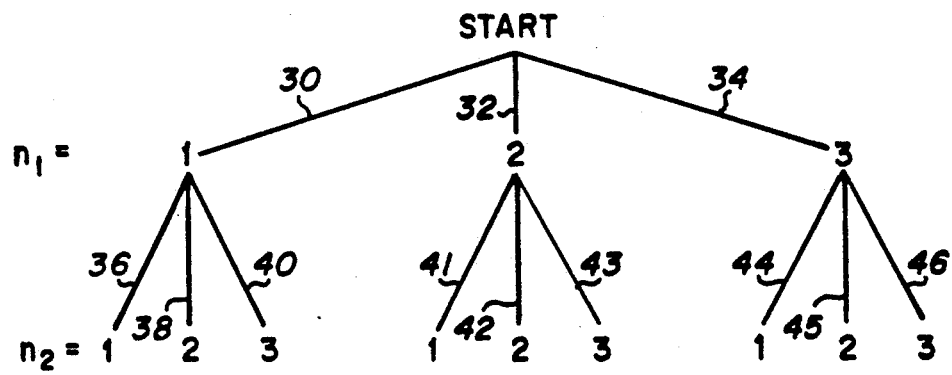
Fig_2
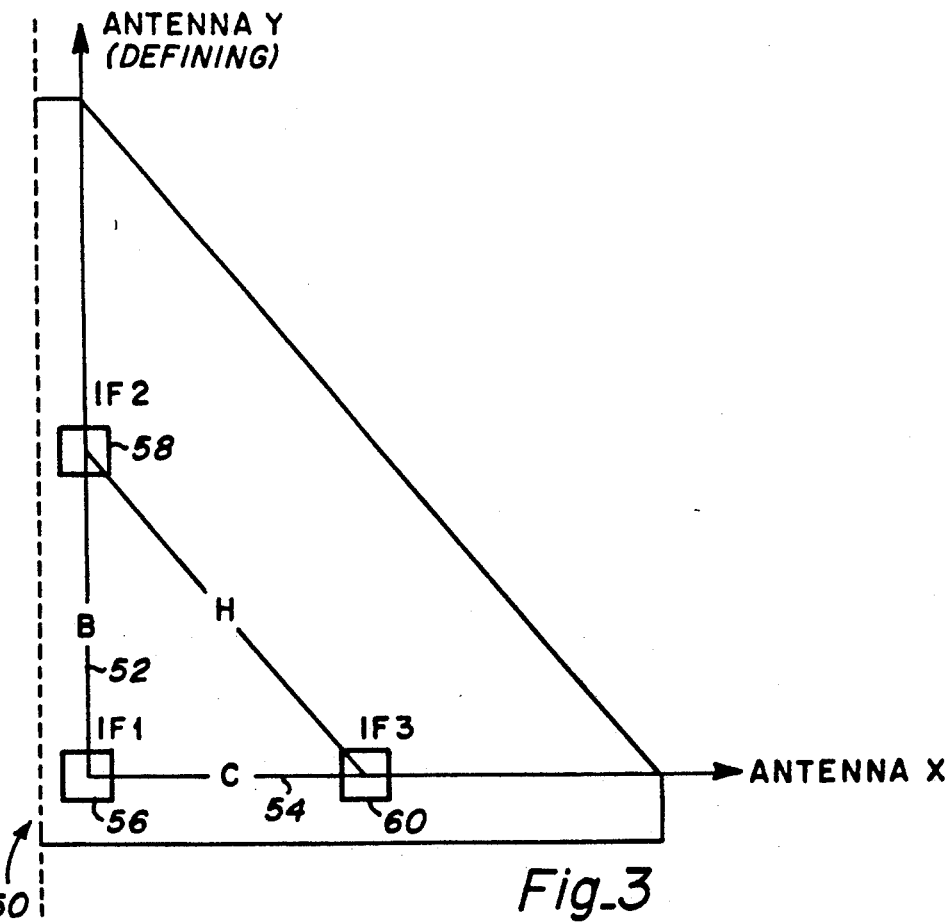
Fig_3

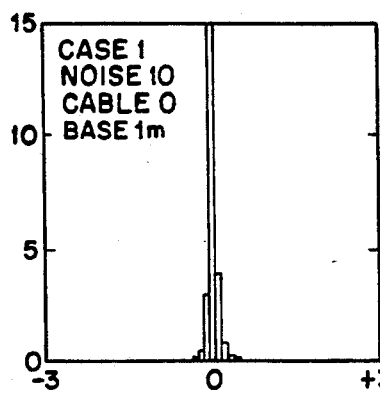
Fig_8a
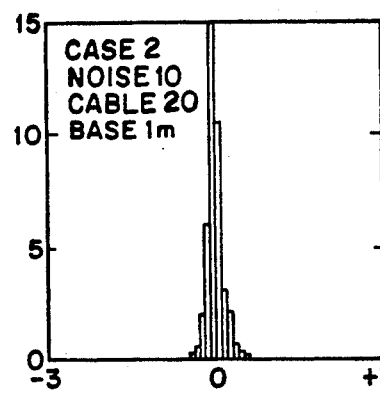
Fig_8b
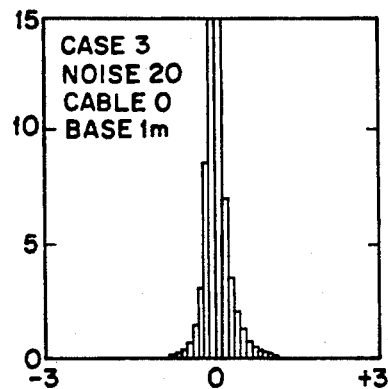
Fig_8c
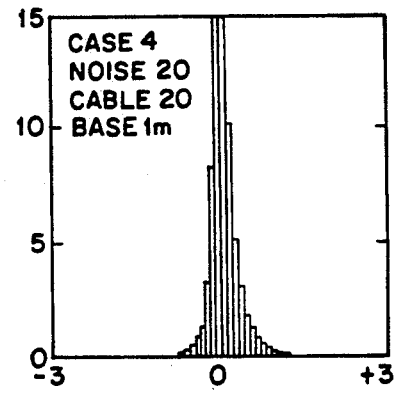
Fig_8d
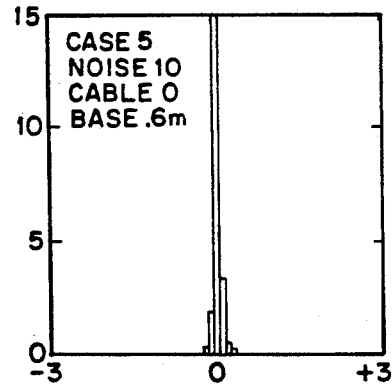
Fig_8e
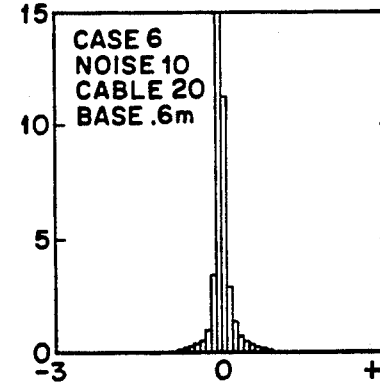
Fig_8f
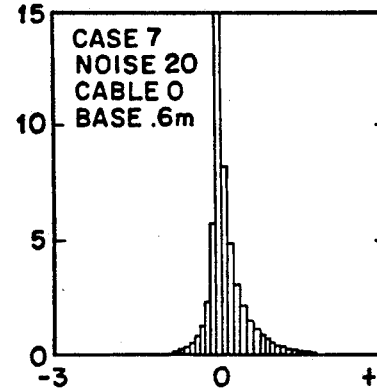
Fig_8g
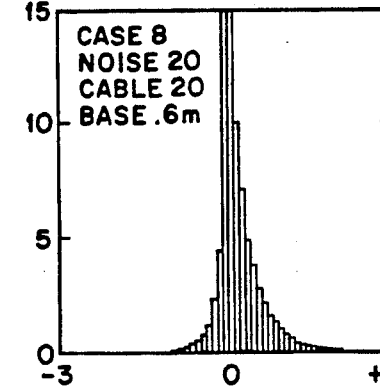
Fig_8h

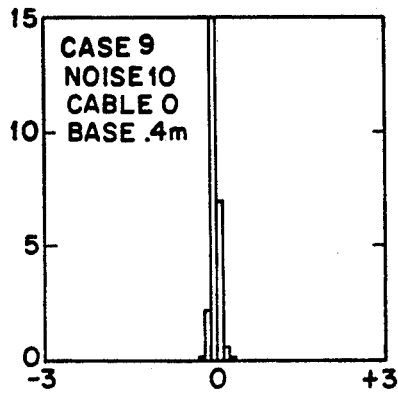
Fig_8i
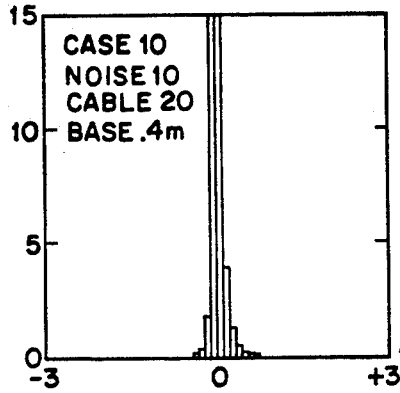
Fig_8j
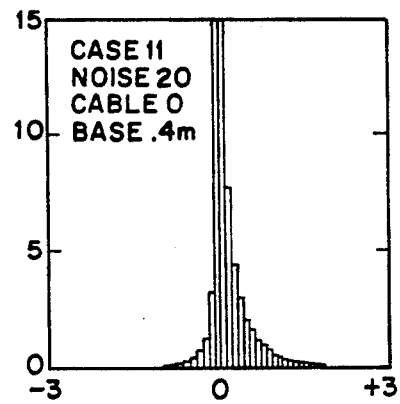
Fig_8k
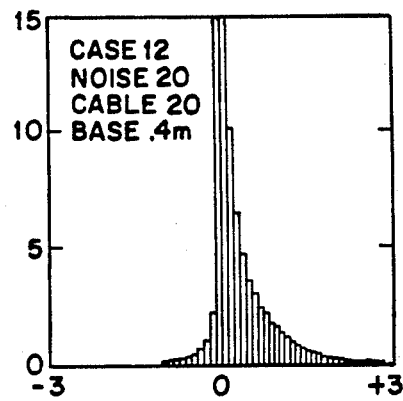
Fig_8l
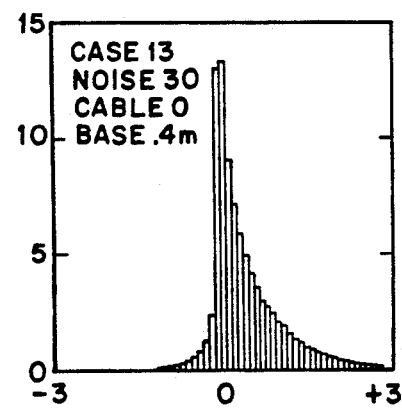
Fig_8m
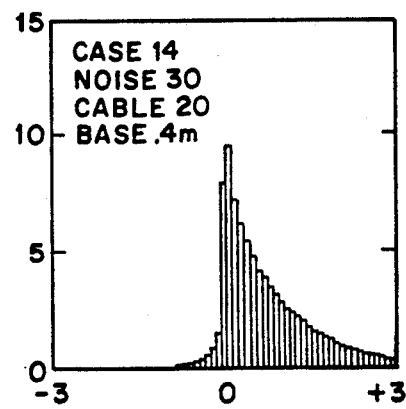
Fig_8n

METHOD AND APPARATUS FOR MAXIMUM LIKELIHOOD ESTIMATION DIRECT INTEGER SEARCH IN DIFFERENTIAL CARRIER PHASE ATTITUDE DETERMINATION SYSTEMS

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all rights whatsoever.

BACKGROUND OF THE INVENTION

1. Field of the Invention

The invention relates generally to attitude determination with global positioning system (GPS) satellite signals and more specifically to the resolution of carrier cycle integer ambiguities in the carrier phase difference measurement between separate GPS antennas attached to a rigid structure.

2. Description of the Prior Art

The United States Department of Defense has placed in orbit a group of satellites as part of a global positioning system (GPS) that can be used by civilians and the military alike to get automated and highly-accurate earth position coordinates on easy-to-read digital displays. Determining where you are has been a particular problem for seafarers for thousands of years. Now, GPS enables small sailboat owners and even combat soldiers to get their positions to within several meters using hand-held portable equipment.

GPS-based attitude determination offers significant cost savings in applications where inertial guidance has traditionally been the standard approach. Attitude is measured by differential measurements of GPS carrier phase between two or more antennas. Performance may be characterized in terms of accuracy and bandwidth, both being dependent on application specific parameters, such as the antenna spacing and the carrier-to-noise ratio.

Factors which limit performance are multipath, carrier-to-noise ratio, and integer resolution. Techniques are available for working around multipath and increasing the bandwidth of differential carrier phase tracking.

The rapid resolution of integer ambiguities in measured GPS carrier phase data is a principal obstacle in high performance systems. Integer ambiguity makes it difficult to determine the integer number of carrier cycles that occur between the antennas and the cable paths. For example, as shown in FIG. 1, a single carrier intersects two antennas. The phase angle at the first antenna is zero degrees, and the phase angle at the second antenna is 72 degrees. There may, however, be an additional full cycle between the antennas. As the signals travel their respective paths from the antennas to a pair of correlators, additional phase shifts appear. If the first antenna cable path is 3.6 wavelengths, and the second is 0.8 wavelengths, the correlator connected to the first antenna sees a signal $\sin(\omega t - 1296$ degrees), while the correlator connected to the second antenna sees a signal $\sin(\omega t + 72 + 360 - 288$ degrees). The signal correlators measure the first-difference carrier phase, the phasor difference between the signals seen at a channel one and a channel two correlator input. For this example, the basic output is a phase measurement of 288 degrees, or 0.8 wavelengths.

Integer Ambiguity Resolution

Since GPS carrier frequencies are so high, the wavelengths are short enough (e.g., 19.02 cm) that phase differences used in attitude determination can easily exceed 360°. Resolving whether a phase difference is within 0°–360°, or 360°–720°, or 720°–1080°, or some other whole cycle, requires more than just a simple phase measurement. Integer resolution has developed into a significant performance issue for attitude determination. It is clear that for attitude determination with GPS to be viable, the integers must be resolvable quickly and reliably under all conditions.

An important element of attitude determination is the separation between translational and rotational degrees of freedom. The choice of a reference point on a platform can be completely arbitrary, if kinematic considerations alone govern the separation of translation and attitude. Platform translation can be effectively removed from a differential measurement. For example, a platform with a single baseline can be constructed using two antennas, a master and a slave. Without any loss of generality, the master antenna location may be defined as a fixed reference point. The possible slave antenna locations are constrained to lie on the surface of a virtual sphere surroundings the master antenna location and having a radius equal to the length of the baseline between the antennas.

There are numerous prior art methods that are used for resolving integer ambiguities. These include integer searches, multiple antennas, multiple GPS observables, motion-based approaches, and external aiding.

Search techniques work well for smaller baselines (on the order of a couple of carrier wavelengths), but they often require significant computation time and are vulnerable to erroneous solutions when longer baselines are used or when only a few satellites are visible. More antennas can improve reliability considerably. If carried to an extreme, a phased array results whereby the integers are completely unambiguous and searching is unnecessary. But for economy, the minimum number of antennas required to quickly and unambiguously resolve the integers, even in the presence of noise, is preferred.

One method for integer resolution is to make use of the other observables that modulate a GPS timer. The pseudo-random code can be used as a coarse indicator of differential range, although it is very susceptible to multipath problems. Differentiating the L1 and L2 carriers provides a longer effective wavelength, and reduces the search space. However, dual frequency receivers are expensive because they are more complicated. Motion-based integer resolution methods make use of additional information provided by platform or satellite motion. But such motion may not always be present when it is needed.

Another prior art method and apparatus for precision attitude determination and kinematic positioning is described by Hatch, in U.S. Pat. No. 4,963,889, comprises the steps of:

determining the approximate initial relative position of a secondary antenna that is freely movable with respect to a reference antenna;

making carrier phase measurements based on the reception of "N" number of satellites, where N is the minimum number of satellites needed to compute the relative position of the secondary antenna;

deriving from the carrier phase measurements an initial set of potential solutions for the relative position, wherein the initial set of potential solutions all fall within a region of uncertainty defined by a sphere having a radius equal to the maximum distance between the two antennas, and wherein multiple potential solutions arise because of whole-cycle ambiguity of the carrier signal;

making redundant carrier phase measurements based on the reception of a carrier signal from an additional satellite (N+1); and eliminating false solutions from the initial set of potential solutions, based on a comparison of the redundant carrier phase measurements with the initial set of potential solutions, to reduce number of potential solutions to close to one, whereby the number of potential solutions is not increased by use of the redundant carrier phase measurements.

"Deriving from the carrier phase measurements an initial set of potential solutions" means deriving the initial set from just two satellites. The rest of the Hatch specification explains why N is exactly two in the case of attitude determination. Planar intersections of wave fronts are formed from the two satellites, thus obtaining a collection of parallel lines. The intersection points of these lines and a baseline sphere are determined, producing the initial set of potential solutions. For example, at column 12, line 35 of Hatch, there are 188 points or potential solutions in the initial set. The phrase "eliminating false solutions from the initial set of potential solutions," means eliminating 187 of those 188 points. The idea of potential solutions refers to the initial set of 188 points.

The Hatch method and the present invention are fundamentally different. The Hatch method is to form an initial collection of around 188 potential solutions using just two satellites, and then to use phase measurements of the remaining satellites to whittle away at that small initial collection, leaving only one candidate solution if phase measurements are accurate enough. The Hatch method avoids having to deal with large numbers of integer combinations. The present invention considers all of the thousands or millions of integer combinations as potential solutions, and solves for the one integer combination that produces the maximum likelihood best fit with the observed phase measurements. The present invention makes a frontal attack on the problem of large numbers of combinations, and finds a practical solution. Hatch teaches against the present invention right in his patent application. The Hatch method has the advantage that it is workable and fast provided that phase measurement errors are on the order of one or two degrees. The present invention has the advantage that it is much more robust in the presence of phase measurement errors which may easily be on the order of ten to twenty degrees in a practical embodiment.

The Hatch method, as well as the other prior art methods, require more computation power or time than is typically available and sometimes do not produce unique solutions. A system of rapidly determining unique solutions by rapidly and simply resolving integer ambiguities is therefore needed.

SUMMARY OF THE PRESENT INVENTION

It is therefore an object of the present invention to provide a method for comparing the relative phase of carrier signals received from GPS satellites to determine the roll, pitch and azimuth of an antenna platform in real-time.

It is a further object of the present invention to provide a system for the rapid resolution of integer ambiguities in measured GPS carrier phase data.

Briefly, a preferred embodiment of the present invention is a computer-implemented method that substantially eliminates integer ambiguity in GPS carrier phase measurements. The method comprises receiving GPS carrier signals and measuring phase differences containing integer ambiguities and then finding the one integer combination and associated antenna platform attitude that gives the best fit with the measured phase differences. If antenna baselengths are one meter, then there are ten carrier phase integer possibilities associated with each satellite-antenna combination. With two antenna baselines and four satellites, there are ten integer possibilities associated with eight such combinations, producing $0 \times 10 \times .... \times 10 = 10^8$, or one hundred million integer combinations. The method effectively searches the entire collection of $10^8$ integer combinations and finds the one-and-only combination that gives the best fit with the measured data. The method accomplishes a maximum likelihood optimization over the full range of integer and attitude possibilities. It does not search out a small subset of possibilities obtained by a rule-of-thumb. The method includes a practical means to search $10^8$ combinations efficiently, so that a typical embodiment can search the entire range of combinations in less than half a second. A decision tree is formed expressing the possible combinations of integers. A weighted fit error is computed at one or more stages of the tree whereby a determination may be made that none of the integer combinations connected to the current branch of the tree can be optimum. The current branch accordingly may be cut, thus reducing computation time. A final integer combination is selected on the basis of best fit with the measured phase data, as determined by the weighted fit error.

An advantage of the present invention is that it provides a system in which roll, pitch and azimuth outputs are available at two Hz, even in the complete absence of integer continuity (i.e., continuos receiver lock on the GPS signals) between successive phase measurements.

Another advantage of the present invention is that it provides a system that will produce usable outputs with phase measurement errors of up to 40° RMS.

Another advantage of the present invention is that it provides a system that arrives at a maximum likelihood estimation (MLE) optimum solution over the full range of integers and vehicle attitudes, and does so efficiently. With antenna separations on the order of a meter, with two antenna baselines and three to six satellites, there can be thousands of possible integer combinations. The present method finds the one and only optimum integer combination and associated vehicle attitude out of all possible integers and attitudes.

Another advantage of the present invention is that it provides a system that can operate with large phase error levels (e.g., by at least a factor of ten compared to the prior art). At a three degree RMS phase error, the present method will support antenna baselengths of eight feet, yielding a solution under dynamics on 95.6% of the two Hz cycles, with RMS absolute azimuth accuracy of 0.43 mils unfiltered, for example.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a block diagram of a differential phase measurement unit for a GPS positioning system, according to an embodiment of the present invention, with a phase difference of 432° between the two antennas;

FIG. 2 is a decision tree illustrating the integer search method of an embodiment of the present invention;

FIG. 3 is a diagram showing an antenna configuration of an embodiment of the present invention;

Figure 5:
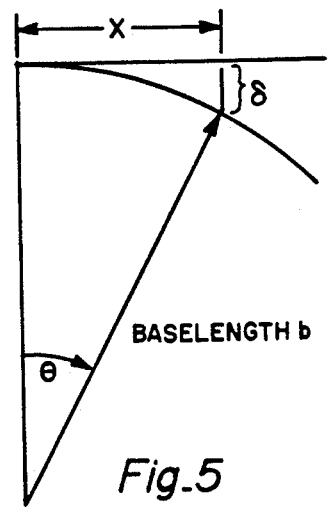
Figure 6:
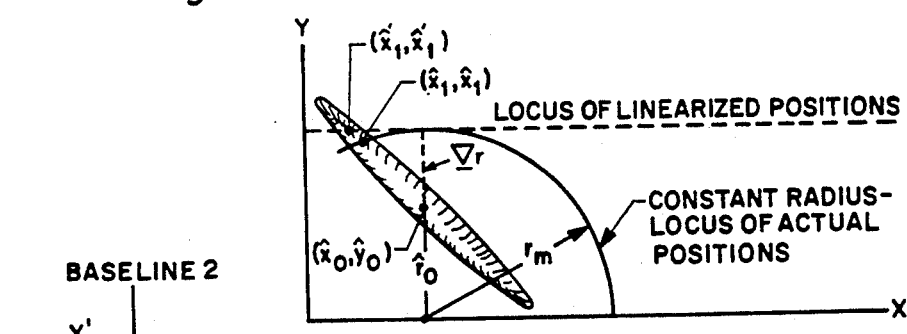
Figure 7:
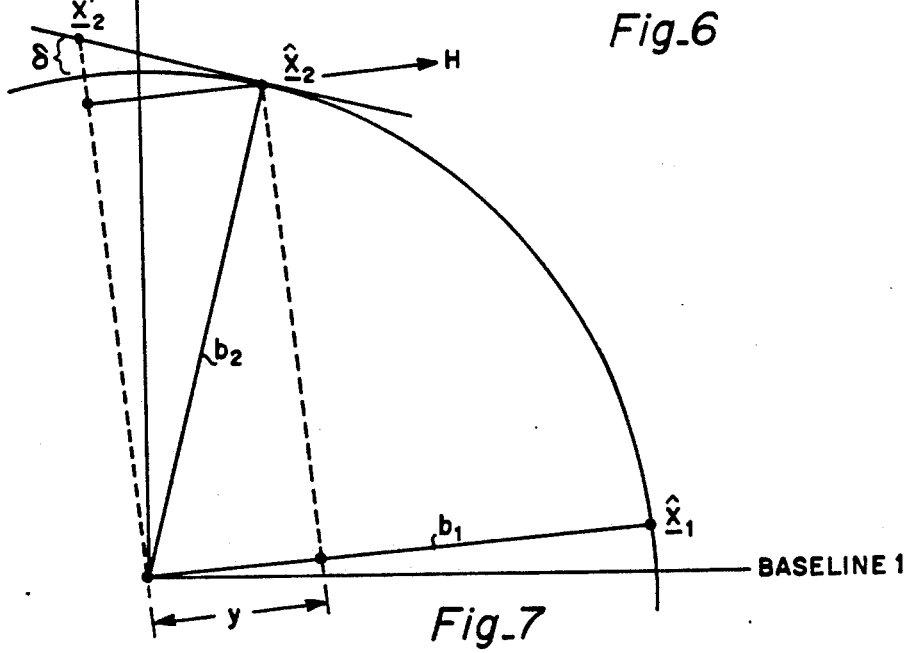

FIG. 5 geometrically illustrates the source of a non-linearity problem in baselength measurement;

FIG. 6 geometrically illustrates the difference between linearized estimates and nonlinear estimates;

FIG. 7 geometrically illustrates non-linearity in an included angle measurement;

FIGS. 8(a)-8(n) each are probability distribution diagrams for W-U found in Monte Carlo simulations of the method of the present invention; and FIG. 9 diagrams a computer-implemented method of the present invention.

DETAILED DESCRIPTION OF THE PREFERRED EMBODIMENTS

FIG. 1 shows an embodiment, referred to by the general reference number 10, of the present invention for comparing the relative phase of carrier signals received from GPS satellites to determine the roll, pitch and azimuth attitude of ships, aircraft, land vehicles and survey instruments carrying an antenna array. A primary technical obstacle overcome with the present invention is the rapid resolution of integer ambiguities in the measured carrier phase data. The cause of the integer ambiguity is the inability of the equipment to determine the integer number of carrier cycles that have occurred between the antennas and the cable paths. FIG. 1 shows the basic system 10 measurement generation. A GPS carrier signal 11, intersects a pair of antennas 12 and 14, which are separated in space. System 10 further comprises a channel-one RF stage 16, a computer 17, a channel-one in-phase (I) correlator 18, a 386-type personal computer (PC) 19, a channel-one quadrature (Q) correlator 20, a 387-type math coprocessor 21 for 64-bit precision arithmetic, a channel-two in-phase correlator 22, a computer memory 23, a channel-two quadrature correlator 24, a computer program 25, a voltage controlled oscillator (VCO) 26, and a channel-two RF stage 28. The phase angle at antenna 12 is 0° (for reference) and the phase angle at antenna 14 is measured at 72°. There is, however, an additional full cycle between the antennas, so the actual phase at antenna 14 is 360°+72°, or 432°. Additional phase shifts occur as the signals travel along their respective cable paths from antennas 12 and 14 to correlators 18, 20, 22, and 24. In the example shown, the channel-one antenna cable path is 3.6 wavelengths, and the channel-two is 0.8 wavelengths. Thus, correlators 22 and 24 see a signal sin ($\omega t - 1296°$) when correlators 18 and 20 see a signal sin ($\omega t + 72 + 360 - 288°$). The signal correlators 18, 20, 22, and 24 are arranged so as to measure the channel-one difference carrier phase, the phasor difference between the signals seen at channel-one and channel-two correlator inputs. For this example, the basic system 10 hardware output is a phase measurement of 288°, or 0.8 wavelengths. There are typically eight such measurements at two Hz, corresponding to four satellites and two antenna pairs.

System 10 is applicable to a military tank for aiming a cannon while moving at top speed through rough terrain and slamming into firing position. The method herein is operable in such environments because it computes a completely new solution each cycle. Outputs of roll, pitch and azimuth are available at two Hz, even in the complete absence of integer continuity between successive phase measurements and prior information about vehicle attitude. It is anticipated that frequent interruption of signals may arise due to obstructions such as freeway overpasses, shading from the vehicle itself, and antenna sky coverage problems when the vehicle is rolled or pitched. High levels of multipath interference are also anticipated due to reflections off the vehicle, the ground and surrounding objects. Also, cable electrical path lengths can vary with differential heating and rough handling.

Method of Resolving Integer Ambiguities

An attitude determination problem is formulated as a maximum likelihood estimation (MLE) optimization, where vehicle attitude and the integers are regarded as unknown parameters to be adjusted in order to maximize the probability of the first-difference carrier phase measurements that are actually generated in the hardware of system 10. That formulation results in weighted-fit error "W" as the objective criterion to minimize. A Kalman filter is introduced, having the same objective criterion. Avoiding unnecessary computation in the Kalman filter leads to a decision tree for the integers. A nested loop is devised that implements the tree, produces all the integer combinations, and merges the optimization over vehicle attitude with the optimization over integers. Two ways are then introduced to prune the tree, cutting off entire branches at points where it can be guaranteed that all integer combinations further down the same branch are not optimum. The first way is to exclude impossible combinations, for example, those that produce an antenna upside down. The second is to generate a lower bound for W at each branch of the tree using:

$$W = \sum_{i=1}^{m} y_i^2 / v_i, \quad (1)$$

where m is the number of measurements, $y_i$ is the measurement residual, and $v_i$ is the innovations variance, all produced as byproducts of the Kalman filter method. A running sum $U_i$ of $y_i^2/v_i$ is kept at each stage i moving down the tree. When that sum exceeds a reasonableness bound, or the current best W found elsewhere in the search, it is guaranteed that all subsequent integer combinations further down the current branch will produce an even larger W and are not optimum. The remainder of the current branch can then be cut off, speeding up the search. Equation (1) is derived in one dimension and can be demonstrated to eleven-digit accuracy in four dimensions.

Once past the above basic approach, the application of the approach to a three antenna system is developed. Next, the performance of the method is described, as implemented with three antennas. Satisfactory performance has been obtained with antenna baselengths of a meter, and in the presence of phase measurement errors of nine degrees, RMS. There is a performance tradeoff between antenna baselength and phase measurement accuracy. The method has been demonstrated with phase measurement errors of up to forty degrees RMS when the antenna baselengths have been shortened. Alternatively, if antenna location and other factors permit phase measurement accuracies better than nine degrees RMS, the antenna baselines may be longer.

Problem Formulation and Basic Solution

The basic system problem formulation and solution as an MLE optimization, including development of an efficient method to locate the MLE best estimate, is treated next. Performance of the estimate is treated herein later, as is the application of the basic solution to a three-antenna system. This explanation is limited to a single antenna pair or baseline, and assumes the system to be linear, aside from the integer ambiguity of the measurements.

If system 10 could measure whole-value phase r without the integer ambiguity:

$$r_{ij} = LOS_i \cdot a_j + b_j + \epsilon_{ij} \quad (2)$$

where
- $i$ = satellite 1..6;
- $j$ = antenna baseline 1..2, or more;
- $LOS_i$ = line-of-sight unit vector that points from receiving antenna toward satellite i, expressed in the local East/North/Up (ENU) coordinate system;
- $a_j$ = antenna baseline vector, in units of wavelengths, connecting the two antennas, the displacement vector from antenna 12 to 14 in FIG. 1, expressed in ENU coordinates;
- $b_j$ = line variation; the residual error remaining after calibration of cable electrical path length, in units of wavelengths; and
- $\epsilon_{ij}$ = phase measurement error; the accumulation of all errors in the phase measurement process, excluding line variation.

All units of distance and phase are in wavelengths, $\lambda = 19.02$ cm, to simplify the notation. The local East/North/Up (ENU) coordinate system is used exclusively. It is assumed that cable bias, $3.6\lambda - 0.8\lambda$ in FIG. 1, has been removed from the measured phase data by an earlier calibration procedure, but there remains a residual line variation $b_j \sim N(0, R_b)$, denoting a Gaussian random error with mean zero and variance $R_b$. Phase measurement error, $\epsilon_{ij} \sim N(0, R_{ij})$ is the Sum of multipath, differential antenna phase center motion, thermal noise, crosstalk, chip bias, smear, transient response of the correlators, and anything else that affects phase measurement accuracy, unless it affects all $r_{ij}$ equally, in which case it is lumped together with line variation:

$$E(\epsilon_{ij}\epsilon_{kj}) = 0, i,k = 1 \ldots 6, i \neq k \; E(\epsilon_{ij}b_j) = 0.$$

The receiver is unable to detect whole-value phase $r_{ij}$ and can only detect phase modulo 360° (one wavelength), $$\theta_{ij} = r_{ij} \text{ modulo } 1$$

The unknown integers are, $$n_{ij} = r_{ij} - \theta_{ij}$$

and equation (2) becomes, $$\theta_{ij} LOS_i \cdot a_j + b_j - n_{ij} + \epsilon_{ij} \quad (4)$$

An optimal estimate is sought for $a_j$ given the available phase measurements $\theta_{ij}$. The $n_{ij}$ and $b_j$ are nuisance parameters.

Estimation problems with a non-linearity such as ($r_{ij}$ modulo one wavelength) are considerably more difficult than linear estimation problems, and admit a wider variety of solutions. The statistics are not Gaussian, and optimal estimation methods often cannot be expressed in closed form, requiring methods for approximation. An approach is sought here which is simple, yet effective.

For this problem $a_j$, $b_j$ and $\epsilon_{ij}$ are independent random variables. The $b_j$ and $\epsilon_{ij}$ are not truly Gaussian, since the tails of a Gaussian distribution exceed half a wavelength where an actual receiver will wrap those measurements around. The $\theta_{ij}$ and $n_{ij}$ are functions of random variables and have very complicated probability distribution functions for any given $a_j$. It is desirable to avoid having to deal with those distributions directly.

The approach adopted here is to simply remove the restriction in (4) that $\theta_{ij}$ has to lie between zero and one. The actual phase measurements out of the receiver in system 10 fall within the range [0..1], but there is no requirement to model it that way. With this simplification, the $n_{ij}$ become independent random variables, as are $a_j$, $b_j$ and $\epsilon_{ij}$. Physical limitations are imposed on $n_{ij}$ later, but for now consider them unrestricted. The $b_j$ and $\epsilon_{ij}$ are then modeled as truly Gaussian, and no distribution is assumed for $a_j$ and $n_{ij}$. In the style of maximum likelihood, $a_j$, $b_j$ and $n_{ij}$ are viewed as unknown parameters to be adjusted in order to maximize the probability of the phase measurements $\theta_{ij}$ that actually occur.

This approach provides a gain in simplicity, because the problem is rendered linear again, however, it costs two things. First, there is some loss of modeling fidelity that could effect performance. It is possible that a rigorously exact model could gain an improvement in the success rate in resolving integers. Second, it requires simultaneously optimizing over both the range of integers and the range of vehicle attitudes, rather than optimizing over one or the other. For a reasonable-sized problem, that means searching for the best solution within a twelve-dimensional space.

As for modeling fidelity, at 40° RMS phase measurement error, the tails of the distributions for adjacent integers cross over at the 4.5 $\sigma$ level. While that is not ideal, it is a good approximation because a 6 $\sigma$ phase measurement error for one integer will look like a 3 $\sigma$ phase error to the next integer, and will still be assigned a low probability. At 30° RMS phase error, the tails for adjacent distributions cross over at the 6 $\sigma$ level, and the crossover can be considered negligible. Modeling fidelity steadily improves as RMS phase error is reduced below that. As for simultaneously optimizing over both integers and attitudes, allowing this particular problem to seem more complicated at first will make it simpler in the end.

Equation (4) can be represented in state notation as $$\theta_i = H_i x - n_i + \epsilon_i, i = 1 \ldots m$$
$$\theta = Hx - n + \epsilon$$

$$x = \begin{bmatrix} a \\ b \end{bmatrix} H_i = [LOS_i \mid 1]$$

where the antenna baseline index $j=1..2$ is dropped to simplify the notation, underscore denotes a vector, and where m is the number of phase measurements associated with the baseline.

Line variation has been identified here as a state of the system rather than a measurement error. Viewing x and n as parameters to be adjusted, the $\theta_i$ are then independent variables, since $E(\epsilon_i \epsilon_k) = 0$, $i \neq k$ from (3). The joint probability density function of $\theta$ is then the product of the individual densities $$p(\theta) = p(\theta_1)p(\theta_2)p(\theta_3)\ldots p(\theta_m) \quad (5)$$

$$p(\theta_i) = \frac{1}{\sqrt{2\pi R_i}} \exp - \left[\frac{(\theta_i - H_i x + n_i)^2}{2R_i}\right].$$

The log-likelihood function is $$\ln p(\theta) = \sum_{i=1}^{m} -\frac{1}{2}\ln(2\pi R_i) - \frac{(\theta_i - H_i x + n_i)^2}{2R_i} \quad (6)$$

and $p(\theta)$ is maximized when $$W = \sum_{i=1}^{m} \frac{(\theta_i - H_i x + n_i)^2}{R_i} \quad (7)$$

is minimized. W is the weighted-fit error, the RSS residual between predicted and measured first-difference carrier phase. The maximum likelihood estimate is the (x,n) that minimizes W. No distribution is assumed for (x,n), however, the knowledge about line variation will be introduced later as a $b=0$ measurement with variance $R_b$. Alternatively, the problem could have been formulated using Bayesian estimation from $$p(x,n|\theta) = p(\theta|x,n)p(x,n)$$

resulting in a minimization of $W + b^2/R_b$.

The optimal estimate sought is the (x,n) that minimizes W:

$$\min_{x,n} W(x,n)$$

This minimization can be split up $$\min_n \left[ \min_x W(x,n) \right] \quad (8)$$

meaning that, within the bracket a minimization is performed over all possible x for a given n, and that a minimization of the bracketed quantity is performed over all possible n.

A Kalman filter or least squares is the natural choice to perform the minimization over x. The computer program for this would be, $$\hat{x}_0 = 0$$

$$P_0 = diag(\infty, \infty, \infty, R_b)$$

(9) for i=1..m do
begin $$y_i = (\theta_i + n_i) - H_i \hat{x}_{i-1}$$

$$v_i = H_i P_{i-1} H_i^T + R_i$$

$$K_i = P_{i-1} H_i^T / v_i$$

$$\hat{x} = \hat{x}_{i-1} K_i y_i$$

$$P_i = (I - K_i H_i) P_{i-1}$$

end where x is the state estimate, P is the error state covariance $E(\hat{x}-x)^T(\hat{x}-x)$, where x is the true state, y is the measurement residual, v is the innovations variance, K is the Kalman gain, H is the observation matrix, R is the measurement variance, and T denotes transpose.

As for minimizing over n, a direct search could be mechanized using a nested-loop method, generating the n using from...to limits for each of the $n_i$:

```
         for n1 = from1 ... to1 do
           begin
(10)         for n2 = from2 ... to2 do
               begin
                 for n3 = from3 ... to3 do
                   begin
                     n = (n1, n2, ..., nm)
                     Compute x̂m from method (9)
                     Compute W (x̂m, n) from equation (7)
                   end
               end
           end .
```

Weighted-fit error W is obtained by substituted $\hat{x}_m$ from (9) into equation (7). After computing W for all possible n and ranking the results, the $(\hat{x}_m, n)$ with smallest W would be the answer.

The method as outlined so far will find the MLE optimum attitude, but is not very efficient. Techniques are now discussed to speed up the method to make it practical for a real-time application.

The Kalman filter in equation (9) can be made faster by pre-computing the gains $K_i$. These have no dependence on the actual data $\theta_i + n_i$, only on $P_0$, $H_i$ and $R_i$. After they have been computed for the first n they are exactly the same for all subsequent n. The only part that has to be computer anew for each n is:

```
         x̂0 = 0
         for i = 1 ... m do
           begin
             yi = (θi + ni) - Hi x̂i-1
             x̂i = x̂i-1 + Ki yi
           end .
```

Computation is still redundant for closely-spaced n. Using the nested loop method in equation (10), the most likely n to follow (1,1,1,1,1,6) would be (1,1,1,1,1,7). For those two integer combinations, the computation for $x_m$ is identical right up to the last step. Redundant computations can be avoided by embedding the Kalman filter into the nested loop:

$$\hat{x}_0 = 0 \quad (11)$$
for $n_1$ = from$_1$ ... to$_1$ do

-continued
```
begin
  y₁ = (θ₁ + n₁) - H₁x̂₀
  x̂₁ = x̂₀ + K₁y₁
  for n₂ = from₂ ... to₂ do
    begin
      y₂ = (θ₂ + n₂) - H₂x̂₁
      x̂₂ = x̂₁ + K₂y₂
      for n₃ = from₃ ... to₃ do
        begin
          y₃ = (θ₃ + n₃) - H₃x̂₂
          x̂₃ = x̂₂ + K₃y₃
```
$$W = \sum_{i=1}^{m} \frac{(\theta_i - H_i \hat{x}_m + n_i)^2}{R_i}$$
```
        end
    end
end.
```

Equations (10) and (11) set up a decision tree for the integers, shown schematically in FIG. 2. At the bottom of the tree, at the tips 36, 38 and 40–46 of the branches, ($x_m$, n) and W are available from equation (11). The one branch end with the smallest W provides the optimum ($x_m$, n).

It is not necessary to save all the n, $x_m$ and W in computer memory to be ranked at the end of processing. Only the optimum case is of interest. A method to find the optimum is to initialize a value $W_{best}$ to a large number, and then each time a W is computed in equation (11) check to see if it is the best so far, in computer program:

```
if (W < W_best) then
  begin
    W_best = W
    n_best = n
    x_best = x̂_m
  end
```

The nested loop in equation (11) avoids the need to store intermediate n, x̂ and W, it speeds up the Kalman filter by avoiding redundant computations for $\hat{x}_m$, and it mechanizes a tree as shown in FIG. 2. Even with these improvements, the method is still too slow because it involves thousands of computations of $\hat{x}_m$ and W.

Though the tree shown in FIG. 2 was not initially conceived of as a decision tree involving discrete yes/no decisions, the analogy is useful. Once a discrete no is determined while moving down a branch of a decision tree, all subsequent considerations further down the same branch can be neglected, vastly simplifying the decision process. Applying that concept, a sub-collection of integers may be found that are clearly impossible taken together, implying that all n further down the same branch containing this sub-collection are also impossible. When such a collection is found at any point in the tree, the remainder of that branch can be left unevaluated. Halting a search early while proceeding down a branch vastly reduces the number of $\hat{x}_m$ and W that have to be evaluated.

The specific checks for impossible integers are:
1. Baselength too short or too long;
2. Vehicle roll or pitch exceeding maximum;
3. Wrong angle between baselines;
4. Antenna upside down; and
5. Satellite signal received from an angle below the antenna ground plane.

The selection of the from$_i$...to$_i$ integer limits in equations (10) and (11) also falls into this category, restricting integers to the outer range of values that are possible in view of the antenna baselengths.

Additional ways are sought to speed up the method. It is desirable to abandon evaluation of an integer combination n as early as possible when it can be determined that the n is not optimal. In fact, it is advantageous to cut off whole branches from the tree of FIG. 2 when it can be determined that all n further down the current branch containing the current sub-collection ($n_1, n_2...n_j$), $j \leq m$, are not optimal.

As stated above, the object of MLE optimization is to adjust the parameters x and n so as to maximize the probability of the measurements θ that have actually occurred. From equation (5), $$p(\theta|x,n) = p(\theta_1|x,n)p(\theta_2|x,n)...p(\theta_m|x,n)$$

The maximization, $$\max_n \left[ \max_x p(\theta|x,n) \right].$$

is equivalent to the W minimization in equation (8). At stage j moving down the tree, the joint probability density of the measurements $\theta_1... \theta_j$ for any given x and n is $$p(\theta_1...\theta_j|x,n) = p(\theta_1|x,n)p(\theta_2|x,n)...p(\theta_j|x,n)$$

with only the first $n_1...n_j$ in n playing a part. Now, if every value for x produces a $p(\theta_1...\theta_j)$ smaller than 0.0001 for example, then the final $p(\theta_1...\theta_m)$ at the bottom of the tree containing this sub-collection $n_1...n_j$ has to be even smaller than 0.0001, since $P(\theta_{j+1}...\theta_m)$ is less than 1.

$$p(\theta_1...\theta_m) = p(\theta_1...\theta_j)p(\theta_{j+1}...\theta_m)$$

$$p(\theta_1...\theta_m) \leq p(\theta_1...\theta_j)$$

If the current best $p(\theta_1...\theta_m)$ found elsewhere in the search is greater than 0.0001, then all n further down the current branch are not optimum, and the current branch can be cut. The $\hat{x}_j$ from equation (11) will maximize $p(\theta_1...\theta_j)$ as best as can be done for the current $n_1,...n_j$, yielding an upper bound $$p(\theta|x,n) \leq p(\theta_1...\theta_j|\hat{x}_j, n_1...n_j)$$

for all $p(\theta|x,n)$ containing the sub-collection $n_1...n_j$. If this bound is below a threshold, then the branch can be cut.

This improves the speed considerably, but still leads to the computation of $$\ln p(\theta_1 ... \theta_j | \hat{x}_j, n_1 ... n_j) =$$

$$\sum_{i=1}^{j} -\frac{1}{2}\ln(2\pi R_i) - \frac{1}{2}\frac{(\theta_i - H_i\hat{x}_j + n_i)^2}{R_i}$$

or of an intermediate weighted-fit error $W_j$ at each stage j, $$W_j = \sum_{i=1}^{j} \frac{(r_i - H_i\hat{x}_j)^2}{R_i}$$

with $r_i = \theta_i + n_i$ analogous to equations (6) and (7).

A much more efficient computation of $W_j$ was discovered, leading to $$W_j = W_{j-1} + y_j^2/v_j, \, j = 1...m \quad (12)$$

$$W_o = 0$$

where $y_j$ are measurement residuals computed in equation (11), and where $v_j$ are computed in equation (9). The $v_j$ need only be computed once ahead of the search, and are byproducts of the computations for Kalman gains $K_j$. The tree can be cut at any branch on stage j when $W_j$ from (12) exceeds the current best weighted-fit error found elsewhere in the search.

Equation (12) can be written out as, $$\sum_{i=1}^{j} \frac{(r_i - H_i \hat{x}_j)^2}{R_i} = \sum_{i=1}^{j} \frac{(r_i - H_i \hat{x}_{i-1})^2}{H_i P_{i-1} H_i^T + R_i} . \quad (13)$$

To illustrate why this occurs, equation (13) is derived in one dimension, and demonstrated numerically in four dimensions.

Special Case

Equation (13) can easily be seen to work in the special case where a priori state information is perfect;

$$P_o = 0, \, \hat{x}_i = \hat{x}_0, \, i = 1, 2, \ldots j$$
$$H_i P_{i-1} H_i^T = 0$$

In this case, both sides of (13) become the same.

Derivation in one dimension

To illustrate that equations (12) and (13) work in one dimension, consider the more general measurement sequence $$(r_0, R_0), (r_1, R_1), (r_2, R_2) \quad (14)$$

The $(r_0, R_0)$ measurement is included to allow for the case where an a priori state estimate is available $$\hat{x}_0 = r_0, \, P_0 = R_0 \quad (15)$$

In one dimension, with $H_i = 1$ and with the measurement $(r_0, R_0)$ added, equation (12) can be written out as $$\sum_{i=0}^{j} \frac{(r_i - \hat{x}_j)^2}{R_i} = \sum_{i=1}^{j} \frac{(r_i - \hat{x}_{i-1})^2}{P_{i-1} + R_i} \quad (16)$$
$$W_j = U_j, \, j = 1, 2, \ldots$$

denoting the sum on the right as $U_j$.

In order to show that $W_1 = U_1$, $W_1$ may be written out as, $$W_1 = \frac{(r_0 - \hat{x}_1)^2}{R_0} + \frac{(r_1 - \hat{x}_1)^2}{R_1} \quad (17)$$

Then substituting into equation (17) using $$\hat{x}_1 = r_0 + K_1(r_1 - r_0)$$

-continued $$(r_0 - \hat{x}_1) = -K_1(r_1 - r_0)$$

$$(r_1 - \hat{x}_1) = (1 - K_1)(r_1 - r_0)$$

$$K_1 = \frac{R_0}{R_0 + R_1}, \, (1 - K_1) = \frac{R_1}{R_0 + R_1}$$

gives $$W_1 = \left[\frac{R_0}{R_0 + R_1}\right]^2 \frac{(r_1 - R_0)^2}{R_0} + \left[\frac{R_1}{R_0 + R_1}\right]^2 \frac{(r_1 - r_0)^2}{R_1}$$

which simplifies to $$W_1 = \frac{(r_1 - r_0)^2}{R_0 + R_1} .$$

This is the same as $U_1$, since from equation (15)

$$U_1 = \frac{y_1^2}{v_1} = \frac{(r_1 - \hat{x}_0)^2}{P_0 + R_1} = \frac{(r_1 - r_0)^2}{R_0 + R_1} \quad (18)$$

so $W_1 = U_1$.

In order to show that $W_j = U_j$ for $j = 2, 3, \ldots$ it will be shown that $$W_j = W_{j-1} + \frac{y_j^2}{v_j}, \, j = 2, 3, \ldots \quad (19)$$

Then, since $W_1 = y_1^2/v_1$, the following can be successively built up, $$W_j = y_1^2/v_1 + y_2^2/v_2 + \ldots + y_j^2/v_j = U_j,$$

for any $j \geq 2$. To begin, suppose that the measurement sequence equation (14) is used to make a new measurement sequence $$(r_0', R_0'), (r_1', R_1'), (r_2', R_2'), \ldots$$

by compressing the first j measurements $r_0, \ldots r_{j-1}$ into a single, more accurate measurement $r_0'$, and re-numbering the rest.

$$r_0' = \frac{\frac{r_0}{R_0} + \frac{r_1}{R_1} + \ldots + \frac{r_{j-1}}{R_{j-1}}}{\frac{1}{R_0} + \frac{1}{R_1} + \ldots + \frac{1}{R_{j-1}}} = \hat{x}_0' = \quad (20)$$

$$\hat{x}_{j-1}, \, r_1' = r_j, \, r_2' = r_{j+1}, \ldots$$

$$R_0' = \frac{1}{\frac{1}{R_0} + \frac{1}{R_1} + \ldots + \frac{1}{R_{j-1}}} = P_0' =$$

$$P_{j-1}, \, R_1' = R_j, \, R_2' = R_{j+1}, \ldots$$

A new set of terms $\hat{x}_i'$, $P_i'$, $(y_i')^2/v_i'$, and $W_i'$ can be generated using the second measurement sequence. The term $y_j^2/v_j$ yields the same value as $(y_i')^2/v_i'$, since from equation (20):

$$\frac{y_j^2}{v_j} = \frac{(r_j - \hat{x}_{j-1})^2}{P_{j-1} + R_j} = \frac{(r_1' - \hat{x}_0')^2}{P_0' + R_1'} = \frac{(y_1')^2}{v_1'} .$$

It was previously shown in equation (18) that $(y_1')^2/v_1'=W_1'$, so for equation (19) it is enough to show that $$W_j \stackrel{?}{=} W_{j-1} + W_1'.$$

Writing out the full expression for $W_j$, $W_{j-1}$ and $W_1'$ $$\left[ \frac{(r_0 - \hat{x}_j)^2}{R_0} + \ldots + \frac{(r_{j-1} - \hat{x}_j)^2}{R_{j-1}} + \frac{(r_j - \hat{x}_j)^2}{R_j} \right] \stackrel{?}{=}$$

$$\stackrel{?}{=} \left[ \frac{(r_0 - \hat{x}_{j-1})^2}{R_0} + \ldots + \frac{(r_{j-1} - \hat{x}_{j-1})^2}{R_{j-1}} \right] +$$

$$\left[ \frac{(r_0' - \hat{x}_1')^2}{R_0'} + \frac{(r_1' - \hat{x}_1')^2}{R_1'} \right].$$

The estimates $\hat{x}_j$ and $\hat{x}_1'$ are the same, since both are weighted averages of the same measurements $r_0 \ldots r_j$. Also, $r_j=r_1'$, $R_j=R_1'$ from (20), so the terms, $$\frac{(r_j - \hat{x}_j)^2}{R_j} \quad \text{and} \quad \frac{(r_1' - \hat{x}_1')^2}{R_1'}$$

above cancel. The next step is to complete the square on the left using $\hat{x}_j=\hat{x}_{j-1}+\delta$, and to substitute $\hat{x}_1'=\hat{x}_j=\hat{x}_{j-1}+\delta$ on the right, $$\left[ \frac{[(r_0 - \hat{x}_{j-1}) - \delta]^2}{R_0} + \ldots + \frac{[(r_{j-1} - \hat{x}_{j-1}) - \delta]^2}{R_{j-1}} \right] \stackrel{?}{=}$$

$$\stackrel{?}{=} \left[ \frac{(r_0 - \hat{x}_{j-1})^2}{R_0} + \ldots + \frac{(r_{j-1} - \hat{x}_{j-1})^2}{R_{j-1}} \right] +$$

$$\left[ \frac{[(r_0' - \hat{x}_{j-1}) - \delta]^2}{R_0'} \right].$$

This is a polynomial in $\delta$. With $(r_0'-\hat{x}_{j-1})=0$ from equation (20), it can be seen that all the $\delta^0$ terms cancel. Equating $\delta^2$ terms, $$\frac{\delta^2}{R_0} + \ldots + \frac{\delta^2}{R_{j-1}} \stackrel{?}{=} \frac{\delta^2}{R_0'}$$

but from equation (20), $$R_0' = \frac{1}{\frac{1}{R_0} + \frac{1}{R_1} + \ldots + \frac{1}{R_{j-1}}}$$

and everything cancels. Equating $\delta^1$ terms gives, $$\frac{-2(r_0 - \hat{x}_{j-1})\delta}{R_0} + \ldots + \frac{-2(r_{j-1} - \hat{x}_{j-1})\delta}{R_{j-1}} \stackrel{?}{=} 0$$

but this rearranges to give equation 20, $$\hat{x}_{j-1} = \frac{\frac{r_0}{R_0} + \frac{r_1}{R_1} + \ldots + \frac{r_{j-1}}{R_{j-1}}}{\frac{1}{R_0} + \frac{1}{R_1} + \ldots + \frac{1}{R_{j-1}}}$$

The above has shown that $W_j=W_{j-1}+y_j^2/v_j$ for $j \geq 2$. Combining that with $W_1=U_1$ verifies equation (16). To obtain the case in equation (12) where there is no a priori state estimate, $R_o$ and $P_o$ are set to $\infty$.

A Numerical Demonstration in Four Dimensions

The foregoing has shown analytically that equations (1), (12) and (13) work in one dimension. Those equations also work in four dimensions as is shown next using computer simulations. Five whole value first-difference phase measurements were simulated from, $$r_i = LOS_i \cdot a + b + \epsilon_i$$

where:

| where: | | |
|---|---|---|
| i | = | satellite 1 ... 5; |
| $LOS_i$ | = | line-of-sight unit vector that points from receiving antenna toward satellite i; |
| | = | $[\cos(el_i)\sin(az_i), \cos(el_i)\cos(az_i), \sin(el_i)]$; |
| $a_i$ | = | antenna baseline vector, in units of wavelengths, connecting the two antennas; |
| | = | $(0.2, 3.1, -0.1)^T$; |
| b | = | line variation; the residual error remaining after calibration of cable electrical path length, in units of wavelengths; |
| | = | $\sigma_b(GAUSS_0)$, with $\sigma_b = 0.0001$ and $GAUSS_0 = 0.91258658376$; and |
| $\epsilon_i$ | = | phase measurement error; the accumulation of all errors in the phase measurement process, excluding line variation; |
| | = | $\sigma_b(GAUSS_i)$, with measurement standard deviation $\sigma_i$ and random number $GAUSS_i$ from Table 1, below. |

TABLE I

| | Phase Simulation Parameters | | | |
|---|---|---|---|---|
| i | Satellite azimuth (degrees) | Satellite elevation (degrees) | Satellite deviation $\sigma_i$ (wavelengths) | $GAUSS_i$ |
| 1 | 58 | 68 | .00008 | −0.67422723211 |
| 2 | −5 | 52 | .00015 | 1.1568557266 |
| 3 | −129 | 38 | .0002 | −1.7763629481 |
| 4 | 120 | 31 | .0001 | 1.6257113172 |
| 5 | 180 | 10 | .000095 | 0.75634609535 |
| 6 | 0 | 45 | .00013 | 0.93056149594 |

Next, $W_5$ and $U_5$ were computed from equation (13) modified to include the a priori information about line bias, using the following computer programming method:

(21)
```
x̂₀ = 0
P_o = diag (∞, ∞, ∞, σ_b²)
U_o = 0
for i = 1 ... 5 do
```

-continued
```
begin
    H_i = (LOS_i | 1)
    y_i = r_i - H_i x̂_{i-1}
    v_i = H_i P_{i-1} H_i^T + σ_i^2
    U_i = U_{i-1} + y_i^2/v_i
    K_i = P_{i-1} H_i^T/v_i
    x̂_i = x̂_{i-1} + K_i y_i
    P_i = (I - K_i H_i) P_{i-1}
end
b̂ = x̂_5(4)
W_o = b̂^2/σ_b^2
for i = 1 ... 5 do
    begin
        W_i = W_{i-1} + (r_1 - H_i x̂_5)^2/σ_i^2
    end.
```

The method shown in equation (21) incorporates a conventional Kalman filter method. All computations use double-precision, 64-bit arithmetic for computational accuracy. Equation (21) is implemented using an equivalent Bierman UD filter method that accomplishes the same end as a conventional Kalman filter, but uses a matrix factorization of the covariance P in order to gain an advantage in numerical precision. It was expected that numerical accuracy would improve with a UD implementation, but it was not known by how much. The results for $W_5$ and $U_5$ were,

(22)
```
conventional Kalman:
    W_5 = 7.0187042033, and
    U_5 = 7.0153980889; and Bierman UD:
    W_5 = 7.0187021447, and
    U_5 = 7.0187021447.
```

The two implementations agreed with each other, and both showed that $W_5=U_5$. The UD filter is much more accurate, yielding an eleven-digit confirmation of $W_5=U_5$. Measurements could be processed in any order without changing the results in equation (22). The satellite constellation could be changed, measurements could be added or deleted, and measurement standard deviations could be changed. In every case, $W_j=U_j$ was confirmed to eleven-digit accuracy using the UD implementation. For example, adding the sixth satellite measurement in Table I gave

```
conventional Kalman:
    W_8 = 8.3694538750, and
    U_6 = 8.3652433542; and
Bierman UD:
    W_6 = 8.3694502224, and
    U_6 = 8.3694502224.
```

Changing the measurement order from (1,2,3,4,5,6) to (3,1,4,2,6,5) gave

```
conventional Kalman:
    W_8 = 8.3694524833, and
    U_8 = 8.3660036441; and
Bierman UD:
    W_6 = 8.3694502224, and
    U_6 = 8.3694502224.
```

The conclusion is that equation (1)

$$W = \sum_{i=1}^{m} y_i^2/v_i \quad (1)$$

works in multiple dimensions, where W is the weighted-fit error, there are m number of such measurements, and where $y_i$ and $v_i$ are from the method in equation (9).

Completing the basic solution

The following refers to FIG. 2. The main consequence of equation (1) is that $$U_j = \sum_{i=1}^{j} y_i^2/v_i, j = 1, 2, \ldots, m$$

is a good lower bound for weighted-fit error $W(x̂_m, n)$. A running sum $U_j$ is maintained at each stage j moving down the integer tree of FIG. 2. A separate $U_j$ can be associated with each branch point of the tree. At any branch point where $U_j$ exceeds a maximum tolerable weighted-fit error, or exceeds the current best W found elsewhere in the search, the tree can be cut, thus speeding up a search. Adding this feature to equation (11) completes the basic method of the present invention.

(23)
```
x̂_0 = 0
U_0 = 0
W_best = W_max
for n_1 = from_1 ... to_1 do
    begin
        y_1 = (θ_1 + n_1) - H_1 x̂_0
        U_1 = U_0 + y_1^2/v_1
        if (U_1 < W_best) then
            begin
                x̂_1 = x̂_0 + K_1 y_1
                for n_2 = from_2 ... to_2 do
                    begin
                        y_2 = (θ_2 + n_2) - H_2 x̂_1
                        U_2 = U_1 + y_2^2/v_2
                        if (U_2 < W_best) then
                            begin
                                x̂_2 = x̂_1 + K_2 y_2
                                .
                                .
                                for n_m = from_m ... to_m do
                                    begin
                                        y_m = (θ_m + n_m) - H_m x̂_{m-1}
                                        U_m = U_{m-1} + y_m^2/v_m
                                        if (U_m < W_best) then
                                            begin
                                                x̂_best = x̂_{m-1} + K_m y_m
                                                n_best = (n_1, n_2, ..., n_m)
                                                W_best = U_m
                                            end
                                    end
                            end
                    end
            end
    end
``` where $θ_i$ are first-difference carrier phase measurements generated by system 10, $H_i=[LOS_i|1]$ is the observation matrix containing the line-of-sight unit vector that points into the direction of GPS signal arrival, and where $v_i$ and $K_i$ are pre-computed using equation (9) or the Bierman UD equivalent.

The method in equation (23) accomplishes exactly the same MLE optimization as would be accomplished by the brute-force method in equation (10). It just does so efficiently. FIG. 9 illustrates a computer implemented method 100 in computer program pseudocode that is equivalent to equation (23).

Some general observations follow, leading to a system implementation with three antennas:

First, the order in which measurements are applied has no effect on $U_m$, since $U_m$ equals weighted-fit error W. The processing order of phase measurements associated with the same baseline can be arbitrary, and the simplest design strategy is to process all phase measurements in whatever order they appear in the GPS receiver interface prior to applying other criteria such as known baselength. This strategy has the advantage of simplicity, since it avoids placing requirements on sub-collections or sub-constellations of satellites. A design strategy that calls for finding a sub-constellation of three satellites with a volume-of-the-tetrahedron greater than 0.1, for example, will fail some of the time even with four satellites available with good geometry for general navigation. The GPS satellite orbits were apparently not designed to support attitude determination methods, they were designed to provide good navigation accuracy most or all of the time. Processing all of the phase measurements from a given baseline at once, in any order, acknowledges this fact about GPS satellite orbits.

Second, after processing all the phase measurements for a given baseline, truth information such as the known base length can be included as very accurate measurements.

Third, upon adding additional measurements, weighted-fit error W either increases or stays the same, since $y_i^2/v_i$ is never negative.

Fourth, if any truth or measurement information is relaxed by using a larger variance R, the sum $\Sigma y_i^2/v_i$ remains a valid lower bound for W. Any measurement can be thought of as a composite of two weaker measurements. Relaxing R is equivalent to dropping one of those weaker measurements, with a corresponding drop in $\Sigma y_i^2/v_i$. This will be important later when dealing with non-linearities. In simulations it was found necessary to cover non-linearities in baselength truth information with measurement noise $R > 0$.

Embodiment of the Present Invention With Three Antennas

The previous section developed the basic method for integer search. It addressed the case of a single antenna baseline. This explanation now addresses extension of the basic method to handle two baselines.

FIG. 3 is a diagram of a three-antenna arrangement generally designated 50, with two antenna baselines 52 and 54. A corner antenna 56 serves as a reference for first-difference carrier phase measurements to a pair of outer antennas 58, 60. Base lengths B and C on the order of a meter are considered here, with an included angle γ subtended by the two baselines of around 90°.

With two baselines, there is a need to find a reference attitude for linearizing. With a single baseline there was no need for such a reference. The four unknown state elements of $\hat{x}$ are antenna position along the local geodetic east, north and vertical axes, plus residual uncompensated cable drift. Changing any one of those state elements produces a proportional change in the whole-value first-difference carrier phase. Changing two of them sums their proportional effects. In other words, the single-baseline system is linear in that regard. With two baselines, there are five unknown state elements of $\hat{x}$, small roll, pitch and yaw attitude errors relative to some nominal antenna coordinate frame used as a reference, plus two residual cable biases, one for each baseline. Small changes in any one of those five state elements produces a proportional change in first-difference phase, and changing two of them sums their proportional effects, so the two-baseline system can be considered linearized about some initial guess for antenna frame orientation if that guess is close enough to the right answer to begin with. The problem is mechanizing an integer search that requires linearizing about a reference attitude when that reference can only come from the integers themselves.

In developing an integer search method for a two-baseline system, it is highly desirable to preserve the character of the basic method developed above. In such a method, a running sum $U = \Sigma y_i^2/v_i$ is maintained at each stage moving down a decision tree representing all the integer combinations. At any branch point, the search is discontinued whenever U exceeds a reasonableness bound or the current best weighted-fit error $W_{best}$ found elsewhere in the search. Since U is a lower bound for W and can only increase at each stage moving down the tree, it follows that at any point on the tree where U is greater than $W_{best}$ it is guaranteed that all integer combinations further down the same branch are not optimum. The branch can be cut off at that point, speeding up the search. With two baselines, the tree has twice as many levels, i.e., eight ambiguity integers instead of four, assuming that there can be four satellites tracked on each baseline. Instead of $10^4$ or ten thousand integer combinations, there are $10^8$ or one hundred million combinations, and the object is to find the one and only integer combination and associated vehicle attitude that satisfies all known constraints about the problem and also gives the smallest weighted-fit error W considering all the phase measurements from both baselines. The information from two baselines is more powerful in resolving ambiguities than from a single baseline. A search may proceed down a branch of the tree and go past the four levels of the first baseline into one or more levels of the second baseline, whereupon it frequently happens that all avenues of the extended search are blocked. When that happens, effectively, information from the second baseline is being used to eliminate integer combinations that otherwise appear reasonable on the first baseline. The best combination of all eight integers has to be found. Additional data from the second baseline strengthens the overall solution, but in the face of a hundred million combinations the only way to ever prove that the best combination has been found is to adhere strictly to the basic method where that proof has been worked out in the last section.

This explanation will be divided into three sub-sections describing a mechanization that preserves the character of the basic method while circumventing the linear reference problem. The sections describe how the method works, why it works, and effects of residual non-linearities. Performance of the full MLE integer search method with two baselines is described in the following section.

An integer search method for a two-baseline system is outlined in the first sub-section. Though it is fairly easy to see how method circumvents the linear reference problem, how it implements the basic method developed above, is further explained. It is shown in the second sub-section that it exactly implements the basic method. Simple analog models are presented that show, aside from residual non-linearities, that the approach yields a $U = \Sigma y_i^2/v_i$ agreeing with final weighted-fit error W to a numerical accuracy of eleven digits. The primary non-linearity with two baselines is completely circumvented without compromising the overall approach. There are residual non-linearities associated with the baselength and included angle measurements that couple with measurement noise in the actual, full implementation that produce noise disturbances in U. A Monte Carlo analysis in sub-section 3 is used to develop mechanisms for compensating the bulk of the disturbance, and to set a margin of error for the remainder.

1. Overview of the Method with Two Baselines

If one antenna baseline is assumed to be known, then the other antenna has to lie in a plane perpendicular to the first. It has to lie somewhere along a section of a circle that would be obtained by holding the first baseline fixed while swinging the other around by 360°. By knowing the limits of vehicle roll and pitch the section of the circle can be narrowed down to a small arc. For the second baseline, it is only necessary to search the integers that are possible if the antenna lies somewhere on that small arc.

In general, the baselengths for a two-baseline system do not have to be the same. If one is shorter, then the strategy is to search for integers on the shortest baseline first where there are fewer integers, then search on the second baseline where there are more integers but where the range can be narrowed considerably to that small arc. This strategy led to the numbering scheme used for the baselines. For purposes of storing data and indexing arrays in a computer-implemented process, the shortest baseline is always assigned number one, and the longest is assigned number two. If the baselengths are equal, or nearly equal, then the choice of numbering is arbitrary.

The overall integer search method with two baselines is as follows: (1) Perform a four-state integer search on the first baseline using the basic method developed in the last chapter, and add known baselength as a very accurate measurement. (2) For each candidate antenna position that results from the first search, calculate the range of integers that are possible for the second baseline, narrowing down to a small arc, and search those. Again, the search on the second baseline is conducted using the basic method developed above, with known baselength used as an added measurement. (3) If there is a candidate antenna position from the second search, and if it survives after processing known included angle γ as a measurement, then form an approximate reference antenna orientation using the two antenna positions. Thus the linear reference that was sought earlier is provided. (4) Perform a five-state Kalman solution for vehicle attitude and two cable biases, linearizing about this reference, and determine the weighted-fit error W that results from comparing all the phase measurement data against this final solution. The candidate vehicle attitude with smallest W is the MLE optimum solution. The running sum $U = \Sigma y_i^2 / v_i$ is carried along through steps (1) through (3). It sums eleven terms, since there are eight phase measurements, two baselength measurements and one included angle measurement. Search is abandoned at any point on the extended tree where $U > W_{best}$. U is a lower bound for W, so any time that U exceeds a certain threshold it is guaranteed that all integer combinations further down the same branch are not optimum, and the entire branch can be cut off at that point.

The overall search method with two baselines is as follows:

(a) Determine the range of integers that are possible for the first baseline, given only the known constraints on vehicle roll and pitch. For satellites that are nearly overhead, only a small range of integers is possible if the vehicle cannot roll or pitch much.

(b) Process all phase measurements from the shortest baseline to determine first-antenna position. The method used is exactly as described earlier, searching the range of integers determined in step (a). The method uses a four-state filter that solves in geodetic coordinates for one antenna position and one cable bias.

(c) For integer combinations that survive step (b), verify that the antenna vertical coordinate is within the limit set by maximum vehicle roll and pitch.

(d) Verify that the baselength computed from antenna coordinates matches the known baselength to within a noise tolerance.

(e) Use known baselength as a very accurate measurement. The antenna position vector is normalized to unit length to serve as Kalman observation matrix H. A measurement variance R is assigned to cover the non-linearity that results from the fact that H is slightly perturbed by noise in the phase measurements.

(f) If the integer combination and antenna coordinate survives to this step, calculate the arc of coordinates that are possible for the second antenna, assuming that the first antenna coordinate is true. Determine the range of integers that are possible for the second baseline, adding a margin to allow for phase measurement noise.

(g) Process all phase measurements of the second baseline to determine second antenna position. There would be more integer combinations to search on the second baseline, since in general it is longer than the first baseline, but it is only necessary to search between the from . . . to limits determined in step (f). Computation time would be prohibitive if this were not possible. This step is an independent, four-state search on the second baseline, mechanized exactly as described above. The only differences are that the integer to . . . from search limits are restricted, and U is initialized from step (e). It thus continues accumulation of a composite lower bound U for weighted-fit error W of the combined, two-baseline system.

(h) For integer combinations on the second baseline that survive step (g), verify that the antenna vertical coordinate is within the limit set by maximum vehicle roll and pitch.

(i) Verify that the baselength computed from the second antenna coordinates matches the known baselength to within a noise tolerance.

(j) Verify that the included angle relative to the first antenna agrees with the known angle g to within a noise tolerance.

(k) Use known baselength of the second baseline as a very accurate measurement. A measurement variance R is assigned to cover the non-linearity, as in step (e). Continue accumulating U with this measurement, and abandon the search at any step where U exceeds $W_{best}$.

(l) Use known included angle g as a very accurate measurement. Here, the measurement is being used in the second, four-state filter as a correction to position of the second antenna in geodetic coordinates. The Kalman H matrix is given by the first antenna position vector normalized to unit length. The measurement actually applied is the known projection of second antenna onto the first baseline. There is a non-linearity in this step that has to be accounted for in computing U. If U is still small enough after this last Kalman update, then a path of the integer search has reached all the way to the end of the tree, and there is a candidate set of eight integers. There are now two antenna position estimates, one for each baseline. The second antenna position estimate is more accurate that the first, because it includes the known angle g between baselines and has thus brought together phase measurement data from both baselines. Also, having the longest baselength, the second antenna position estimate gives the most accurate angular information.

(m) Compute the Y axis of a reference antenna coordinate system by normalizing the second antenna position vector. This gives a vector of unit length, in geodetic coordinates, that points along the roll axis of an antenna coordinate system. It determines two degrees of freedom of this coordinate frame. The other antenna position determines a plane containing both antenna baselines. A Z or yaw axis of -continued the antenna coordinate system is defined to be normal (perpendicular) to this plane, with a polarity chosen in such a way that the Z axis always points somewhere toward the sky. An X, or pitch axis then completes a right-handed coordinate system.

(n) Now that a nominal antenna reference frame is available, determine whether any satellite line-of-sight vectors lie below the X-Y plane. Valid phase measurements should not be possible for signal direction of arrival that is below the antenna ground plane. A cutoff angle of −5° is used to allow for noise in the frame orientation, and to allow some margin for low-elevation gain.

(o) With a candidate set of integers and a linear reference frame available, mechanize a five-state filter for the small roll, pitch and yaw angles that rotate this frame into the antenna orientation that gives the closest agreement with measured phase. Closest agreement means minimum weighted-fit error W using all eight phase measurements. The state vector includes the two cable biases.

(p) Compare W from this solution with the best W found elsewhere in the search. If the new W is better (i.e., smaller), then update $W_{best}$ and save this set of integers and associated attitude as potentially the MLE optimum.

(q) Continue the search until all integer combinations have been exhausted.

In test models where the small non-linearities are removed from steps (e), (k) and (l), the sum $U = \Sigma y_i^2/v_i$ after step (l) agrees with weighted-fit error W from the five-state filter in step (o) to a numerical accuracy of eleven digits. The next section explains how it is possible to concatenate two four-state filters that each solve in geodetic coordinates for one antenna position and one cable bias, and obtain a sum U that agrees to eleven digits with the W of a single, combined five-state filter that solves for vehicle rotations and two cable biases.

2. The Two Baseline Method

The method (a)...(q) outlined above for two baselines adheres strictly to the basic approach worked above and summarized in (23). It arranges the integers into a decision tree representing all the possibilities, it keeps a running sum $U = \Sigma y_i^2/v_i$ at each level searching down the tree, it abandons search at any point where U exceeds the current best weighted-fit error $W_{best}$ found elsewhere in the search, and it selects the final attitude solution that gives the smallest W. It is guaranteed that the MLE optimum solution has been found because U is a lower bound for W and can only increase at each level moving down the tree.

There are three factors that disguise the basic method as implemented in steps (a)...(q) above. First, there is a difference in coordinate systems. The two smaller filters obtain U while solving for antenna positions in a Cartesian coordinate system, whereas the larger filter obtains W while solving for rotations. Second, there is a difference in the number of states. The two four-state filters each have states for one cable bias and three elements of position for one antenna, whereas the five-state filter has states for three rotations and two cable biases. And third, it is not apparent how the two four-state filters are connected in such a way that their combined solution adds up to result in U=W accurate to eleven digits.

As for operating in different coordinates, it will be readily understood by those of ordinary skill in this field that whether a problem is solved in polar coordinates or rectangular coordinates does not matter as long as both implementations give the same solution. The weighted-fit error W is then based on differences between actual measurements and predicted measurements without regard to the coordinate system used.

As for having different numbers of states, in this particular problem the states in question are cable biases. They are nuisance parameters, each of which only affects measurements from one baseline. In this application, the five-state filter with both cable biases actually goes through the same steps as the two smaller filters with one cable bias state each, as will be explained next.

Figure 4:
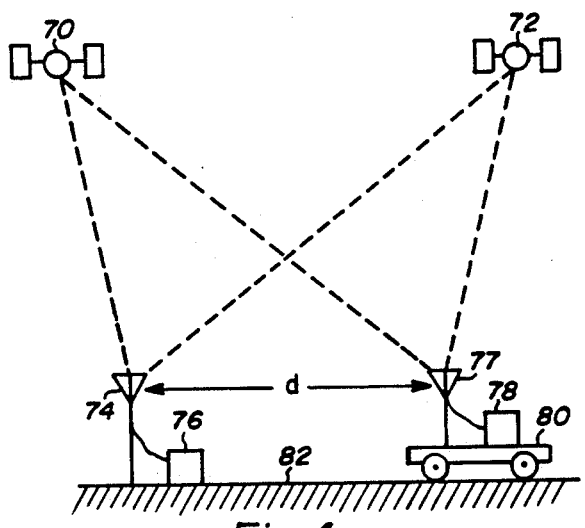
FIG. 4 illustrates a two-dimensional example problem which is used as a simple analog to describe a method embodiment of the present invention.

A simplified analog problem is shown in FIG. 4. A pair of GPS satellites 70, 72, a first antenna 74, a first receiving unit 76, a second antenna 77, a second receiving unit 78, a cart 80 and a track 82 on which the cart 80 is mounted for movement are shown to illustrate how the distance between first antenna 74 and second antenna 77 is determined. Cart 80 is allowed to move in one dimension along a railroad track 82, and the goal is to estimate its position on track 80 relative to first antenna 74. Cart 80 has antenna 77 mounted thereon. Antenna 77 has a splitter (not shown) so that the GPS signal goes to two receivers within receiving unit 78. Each receiver measures phase to two overhead satellites 70,72, and each receiver has a clock bias that has been calibrated and removed except for a small, residual, zero-mean bias $b_1$ or $b_2$ with standard deviation $\sigma_b = 0.012$ wavelengths. There are three unknowns, the position of cart 80 in d units of wavelengths, and the two clock biases. Satellite 70 in FIG. 4 is to the left of cart 80 at an elevation of 60°, and satellite 72 is to the right of cart 80 at an elevation of about 45.573° so as to give observation H matrices $H_1 = (-0.5, 1, 0),$ $H_2 = (+0.7, 1, 0),$ $H_3 = (-0.5, 0, 1),$ and $H_4 = (+0.7, 0, 1).$ The four phase measurements $\theta_i$ were simulated using The four phase measurements $\theta_i$ were simulated using
$\theta_i = H_i \underline{x} + \sigma_m \text{noise}_i, i = 1 \ldots 4$
$\sigma_m = 0.01$
with truth state $x = (d, b_1, b_2)^T$ and noise
| | |
|---|---|
| d = 5 | $\text{noise}_1 = -0.67422723211$ |
| $b_1 = 0.010951039005$ | $\text{noise}_2 = 1.1568557266$ |
| $b_2 = -0.021316355377$ | $\text{noise}_3 = 1.6257113172$ |
| | $\text{noise}_4 = 0.75634609535$ | resulting in phase measurements,
$\theta_1 = -2.4957912333$
$\theta_2 = 3.5225195963$
$\theta_3 = -2.5050592422$
$\theta_4 = 3.4862471056$ Next, a three-state Kalman filter was run:
$\hat{x}_0 = 0$
$P_0 = \text{diag}(\infty, \sigma_b^2, \sigma_b^2)$
$U_0 = 0$
for $i = 1 \ldots 4$ do
  begin
  $y_i = \theta_i - H_i \hat{x}_{i-1}$
  $v_i = H_i P_{i-1} H_i^T + \sigma_m^2$
  $U_i = U_{i-1} + y_i^2/v_i$
  $K_i = P_{i-1} H_i^T/v_i$
  $\hat{x}_i = \hat{x}_{i-1} + K_i y_i$
  $P_i = (I - K_i H_i) P_{i-1}$
  end
with a resulting output

(24)
| | |
|---|---|
| $\hat{d} = 5.0041193509$ | $P_{11} = 6.8950810350\text{E-}5$ |
| $\hat{b}_1 = 0.0096140385536$ | $P_{22} = 3.7493294719\text{E-}5$ |
| $\hat{b}_2 = -0.0072875901583$ | $P_{33} = 3.7493294719\text{E-}5$ |
| U = 3.1849042772 | W = 3.1849042772. |

Now, if two two-state filters are run separately for each

-continued receiver, the results are

(25) $\hat{d} = 5.0161005287$     $P_{11} = 1.3790162070E\text{-}4$
$\hat{b}_1 = 0.0087247140174$     $P_{22} = 3.7873187376E\text{-}5$
$U_1 = 0.71726110304$ for the first receiver, and

(26) $\hat{d} = 4.9921381731$     $P_{11} = 1.3790162070E\text{-}4$
$\hat{b}_2 = -.0063982656221$     $P_{22} = 3.7873187376E\text{-}5$
$U_2 = 0.38574420505$ for the second receiver. Now take the $\hat{d}$ output from the second two-state filter, $\hat{d} = 4.9921381731$     $P_{11} = 1.379016207E\text{-}4$ and process that as an additional measurement in the first two-state filter. The result is

(27) $\hat{d} = 5.0041193509$     $P_{11} = 6.8950810350E\text{-}5$
$\hat{b}_1 = 0.0096140385536$     $P_{22} = 3.7493294719E\text{-}5$
$U_1 + U_2 = 3.1849042772$ which agrees to eleven digits with outputs of the three-state filter in equation (24).

The three-state filter is really doing the same thing as the two two-state filters combined. The three-state begins by processing the two phase measurements of the first receiver. That generates correlated estimates for $\hat{d}$ and $\hat{b}_1$, but has no effect on $\hat{b}_2$. Up to that point, the three-state filter has started out the same as the first two-state. The next two measurements in the three-state are de-coupled with $\hat{b}_1$, and can only affect $\hat{d}$ and $\hat{b}_2$ directly. $\hat{b}_1$ is affected because it is correlated with d which is driven with measurements from the second receiver. The three-state filter begins the second set of measurements with a priori information about d from the first set of measurements. The net result after four measurement updates is that the three-state filter ends up with an estimate $\hat{d}$ in (24) that is the average of $\hat{d}_1$, and $\hat{d}_2$ estimated separately in (25) and (26), $$5.0041193509 = (5.0161005287 + 4.9921381731)/2$$

As for $U = \Sigma y_i^2/v_i$ ending up the same by both methods, again, it turns out that the three-state filter is really doing the same thing as the two two-state filters combined. The three-state starts off summing U exactly as the first two-state, the added $\hat{b}_2$ state is not observable and has no effect. Next, when measurements are processed from the second receiver, $b_1$ is not observable and plays no part in the accumulation of U. The observation matrix has a zero, $H = (..., 0, ...)$ corresponding to the bias state $b_1$, so when $y_i$ and $v_i$ are computed, as $$y_i = \theta_i - H_i \hat{x}_{i-1}$$
$$v_i = H_i P_{i-1} H_i^T + \sigma_m$$
$$U_i = U_{i-1} + y_i^2/v_i,$$

that zero in H prevents $\hat{b}_1$ from having any effect on $y_i$, and it effectively deletes the row and column of $P_{i-1}$ corresponding to $b_1$ when computing $v_i$. The effect on U of beginning the second set of measurements with an a priori estimate for $\hat{d}$ is exactly the same as the effect of applying the $\hat{d}$ estimate from one of the two-state filters as a measurement in the other. We could just as well have initialized one two-state with the outputs of the other. It makes no difference in what order measurements are processed, the end result for U has to be the same. All the information from the first set of measurements that can influence the overall best estimate for $\hat{d}$ is contained in the a priori estimate for $\hat{d}$ as the second set of measurements are processed.

The same holds true when extending this idea to the two-baseline attitude determination problem. All the information from phase measurements on the first baseline that can influence the overall best estimate for second baseline position is contained in the included angle measurement $\gamma$ in step (l).

A test model of the method (a)...(q) demonstrated the same behavior in determining attitude as was just described for the railroad cart example. The non-linearities in steps (e), (k) and (l) were removed by substituting truth observation matrices $H_i$ and by replacing rotations with the first-order approximation, $$a' = \begin{bmatrix} 1 & -\phi_3 & \phi_2 \\ \phi_3 & 1 & -\phi_1 \\ -\phi_2 & \phi_1 & 1 \end{bmatrix} a,$$

where $a'$ is the vector obtained from any vector a by applying small rotations $\phi = (\phi_1, \phi_2, \phi_3)$ about the roll, pitch and yaw axes of a reference antenna coordinate system. If $a'$ represents an antenna position vector, then whole-value phase $\theta$ is given by:

$$\theta = LOS \cdot a + b,$$

where LOS is satellite line of sight, and b is cable bias. If the state vector x is made up of rotations and cable biases, $x = (\phi_1, \phi_2, \phi_3, b)^T$ then the observation matrix H for the combined five-state filter in step (o) is given by:

$$\theta = LOS \cdot \begin{bmatrix} 1 & -\phi_3 & \phi_2 \\ \phi_3 & 1 & -\phi_1 \\ -\phi_2 & \phi_1 & 1 \end{bmatrix} a + b$$

$$H = \frac{\partial \theta}{\partial x} = [(a \times LOS)^T 1].$$

With the non-linearities gone from steps (e), (k) and (l), the test model gives a combined $U = \Sigma y_i^2/v_i$ from the two four-state filters that agrees to eleven digits with weighted-fit error W of the five-state filter. Also, in keeping with the railroad cart example, the second four-state filter in step (l) produces an estimate for position of the second antenna that agrees to eleven digits with $a'$ that results by applying the rotations $(\phi_1, \phi_2, \phi_3)$ estimated by the five-state filter. If it were not for those residual non-linearities in steps (e), (k) and (l), the five-state filter would be superfluous.

3. Effects of Residual Non-linearities

To first order, the non-linearities in the system have been accounted for using the two four-state filters, plus a five-state filter as outlined in (a)...(q). In actual implementation, however, there are additional nonlinear effects which are discussed in this sub-section.

Receiver measurements of phase are processed through estimation methods, resulting in a solution for vehicle attitude. Small errors in measurements of phase are processed through the same methods, resulting in small errors in the solution for vehicle attitude. As long as estimation methods are linear, the effects of measurement errors and the resultant attitude errors are exactly modeled in the Kalman filter. When the estimation methods have non-linearities, however, small errors in measurement of phase couple with non-linearities to produce additional random error effects on top of those modeled in the filter. Generally, those effects are not zero mean, and have complicated probability distributions. Since most systems are not completely linear, it becomes a question of how large are those additional effects, how much trouble do they cause, and what can be done to account for them.

In the test model, observation matrices $H_i$ were derived from truth antenna baseline vectors, whereas in actual implementation, the only information available to compute $H_i$ is the antenna position estimate $\hat{x}$ containing error due to phase noise. That makes H a random variable, and as H is processed through the system, $$v = H P H^T + R$$

$$U = U + y^2/v$$

$$P = (I - KH)P$$

and so v, U and P become random variables also.

Non-linearities should have no effect on final computed vehicle attitude and weighted-fit error W since, by mechanizing two four-state filters to get an approximate attitude, and then mechanizing a five-state filter starting from there, one of the main techniques for dealing with non-linearities has been implemented, i.e., iterating on the solution. Operations in the five-state filter are completely linear because the errors it has to solve for are very small. The selection among possible attitude solutions and integers is completely unperturbed by non-linearities.

The only way that residual non-linearities cause trouble for the present invention is by perturbing $U = \Sigma y_i^2/v_i$ as it is being summed through the two four-state filters. Because of these perturbations, U acquires a random distribution about W of the five-state filter. If U is smaller than W, it could slow the system down when extra candidate attitude solutions are processed through the five-state filter that could have been rejected based on U alone. The real cause for concern, however, is that U might be too large in a percentage of cases, causing the right attitude solution to be rejected and thereby making the system susceptible to error. U is supposed to be a lower bound for W, and here is a mechanism that could make it not a lower bound.

Two techniques were found to compensate the bulk of the effect, and Monte Carlo analysis was used to develop a margin of error for the remainder. Instead of abandoning search at any point on the tree where $U > W_{best}$, the modified strategy is to abandon search at any point where $U > W_{best} + 2$, allowing a margin of error of 2 in the computation of U. The resulting method appears to be completely satisfactory for receiver phase measurement error levels up to 30° RMS, and the situation steadily improves as phase measurement errors are made smaller.

Non-linearity in baselength measurement

FIG. 5 shows the general size of non-linearity in the baselength measurement. Moving a short distance "x" along a tangent to a circle instead of staying on the circle leads to a difference in position, $$\delta = \frac{x^2}{2b}.$$

where b is baselength, the radius of the circle. If x is Gaussian with variance $\sigma^2$, then the average and RMS values for $\delta$ are:

$$E\delta = \int_{-\infty}^{\infty} f(x) \left[\frac{x^2}{2b}\right] dx = \left[\frac{\sigma^2}{2b}\right],$$

$$E\delta^2 = \int_{-\infty}^{\infty} f(x) \left[\frac{x^2}{2b}\right]^2 dx = 3\left[\frac{\sigma^2}{2b}\right]^2, \text{ and}$$

$$f(x) = \frac{1}{\sqrt{2\pi\sigma^2}} \exp - \left[\frac{x^2}{2\sigma^2}\right].$$

FIG. 6 illustrates where a Kalman measurement update using known baselength will place the antenna. The antenna will be placed at $(\hat{x}_1', \hat{y}_1')$ in FIG. 6, rather than at $(\hat{x}_1, \hat{y}_1)$. Though a higher-order estimation technique could be used in place of the Kalman filter, computation time would be prohibitive. A way to cover the non-linearity with measurement noise is to assign a variance $R_{rad}$ to the baselength measurement $$R_{rad} = E(2\delta)^2 = 3\sigma^4/b^2, \quad \sigma^2 = P_{11} + P_{22} + P_{33}.$$

Here, the two-sigma level for $\delta$ is used, and an upper bound for $\sigma^2 = Ex^2$ is obtained from the trace of the a priori covariance matrix P, dropping off the cable bias term $P_{44}$. This value for R insures that $(\hat{x}_1, \hat{y}_1)$ in FIG. 6 will lie within the error ellipse after applying the baselength measurement. $R_{rad}$ only has to be computed once outside the integer search loop. This is one of the two techniques that were adopted to keep $U = \Sigma y_i^2/v_i$ less than W.

Non-linearity in included-angle measurement

Simulations illustrated occasional large outliers in U that were tracked down to the included angle measurement $\gamma$. FIG. 7 illustrates a drawing of one case that was found in simulation. Here the true baselines are shown at right angles. Estimates for baseline positions are shown at $\hat{x}_1$ and $\hat{x}_2$. The estimates lie on a circle of radius b because known baselengths have been applied as measurements. The included angle $\gamma$ is known to be 90°, but the projection y of $\hat{x}_2$ onto $\hat{x}_1'$ is substantial. The filter correction will move the estimate toward $\hat{x}_2$. If it moves all the way, the estimate will be a distance $\delta$ off the circle. It can be seen in FIG. 7 that if the error ellipse corresponding to the covariance matrix $P_2$ at $\hat{x}_2$ were to be flattened into a thin saucer after the baselength measurement, and if the measurement residual y were to be processed as if $\hat{x}_1$ were known perfectly, then the estimate $\hat{x}_2+$ after the update would move out to $\hat{x}_2'$. Its distance off the sphere would then be $$\delta = y^2/2b_2.$$

Adding $\delta^2$ to R for the included angle measurement was sufficient to bring U down below W in this particular case. Simulations were repeated with this fix in place, and the outliers in U vanished. Combining this technique with $R_{rad}$ for the baselength measurements compensated the bulk of noise in U, as found in Monte Carlo simulations. In the majority of cases, U was less than W, with only a small $U > W$ distribution tail. The fix was not overly conservative, meaning that it did not make U too small in a majority of cases. Also, it was noted that $R_{rad}$ and $\delta^2$ vanish with the fourth power of receiver measurement noise as the system is made more and more accurate.

Value U can still be larger than W some of the time, so it was necessary to set a margin of error. It was found that a margin of two was satisfactory under a wide range of operating conditions. FIGS. 8(a)-(n) show probability distributions for W-U found in Monte Carlo simulations. Fourteen cases are shown, obtained by varying phase measurement noise and cable drift in degrees RMS, and by varying baselength in meters. In cases (a)-(d), equal baselengths of one meter were used. In cases (e)-(h), sixty cm baselengths were used, and in cases (i)-(n), forty cm baselengths were used. Receiver noise levels of 10°, 20° and 30° RMS were simulated. Cable drift levels of 0° and 20° RMS were simulated to hit the extremes. The distributions tend to be skewed to the right, as was desired in order to keep U a lower bound for W. There is a small distribution tail to the left of zero, meaning that some times U was larger than W. A margin of error of two was found to be satisfactory over a wide range of conditions.

MLE Performance with Three Antennas

The preceding sections have described a method for selecting integers and vehicle attitudes. That method is to pick the integers and attitude that give the best fit with the measured phase data. This explanation describes performance in terms of whether the method always finds the right answer, how fast the method is, the accuracy of attitude determination, error rate, no-solution rate, effects of antenna configuration, and range of conditions handled by the method.

The method performance is statistical in nature, and varies as a function of conditions. With shorter baselengths and small phase measurement errors, the method is fast and finds the right solution nearly 100% of the time. If baselengths are long enough, and phase error levels are large enough, the method slows down and can't find solutions at all. And then there is a gray zone in between.

Its basic performance statistics are speed, accuracy, no-solution rate (NS), and error rate (ER). Speed is the average computation time required to find a solution, or to declare no solution. Accuracy is the roll, pitch and yaw errors in degrees or mils RMS in situations where it has found the right answer. NS and ER are the probabilities that the method will declare no solution, or declare that it has a solution but have the wrong solution.

Performance mostly depends on the antenna baselengths, the included angle $\gamma$, phase measurement error level $\sigma_m$, cable drift error level $\sigma_b$, the maximum vehicle roll or pitch, and satellite availability and geometry. With two baselines of equal length, an included angle of 90° is optimum, for both accuracy and NS. Accuracy improves with longer baselengths, but NS, ER and execution time also increase with baselength. The maximum baselength that can be used in an application, such as on a ship, is determined by the vehicle roll/pitch limits, and by $\sigma_m$ and $\sigma_b$. Baselength should be increased until NS, ER or execution time reach a maximum allowable level. Improving phase measurement accuracy by any means, such as by reducing multipath interference, rapidly improves system accuracy, because it allows longer baselengths for a given NS, ER or average execution time, and because smaller phase errors produce smaller attitude errors directly.

Nature of the MLE optimum

The goal of MLE optimization is to pick the most likely vehicle orientation and integers, given the phase measurements. The most likely solution is the one that satisfies all known constraints about the problem and also gives the best fit with measured phase data. With normal measurement errors in phase data, it can occasionally happen that there is another solution for vehicle orientation and integers that gives a smaller W than the true solution, and that the computer-implemented process will pick this wrong solution.

Studying this error behavior with simulations, wrong solutions were found with W as small as 0.4, and there is no reason to believe that a wrong solution could not turn up with W of zero. The wrong solutions do not always show a drastic orientation error, or exhibit some other behavior that would make them easy to recognize. The wrong solution is sometimes within 3° to 5° of the right one.

Two items were found that made it possible to detect a wrong solution. First, the wrong solution did not persist if a fraction of a second later new phase data became available with new phase measurement errors. Second, the right solution is nearly always a close second best. The two solutions might give W of two and four, or 18 and 20, but the difference is usually on the order of zero to five. Simulation revealed a difference of less than seven in nearly every case.

An additional means of detecting wrong solutions is to set an upper limit for W. It was found in several days of simulated operation that weighted-fit error W of the right solution was less than an upper limit of 22 with probability 0.9992, when operating with four satellites. A slightly smaller limit could be used with three satellites, or with large cable drift uncertainty, but a single cutoff can be used for simplicity.

The modified method, then, is to pick the vehicle attitude and integers that give smallest weighted-fit error W, and to declare no solution if W is greater than 22, or if there is a second solution that has a W within seven of the optimum.

The method is independent of the platform or vehicle, and does not rely on external sensors. Consequently, the same computer-implemented process can work on ships, aircraft and on survey instruments. Use of additional sensors was avoided in order to keep the system simple, and because even knowing true azimuth to within 3° was not sufficient to guarantee a right solution. In specific applications of the MLE search method, however, there is nothing to prevent the use of additional data to improve the method's success rate. For example, on an aircraft with a GPS velocity of 250 knots, true aircraft heading is very likely to be within 10° of GPS course over ground. That fact can be used to advantage when attempting to detect MLE solution errors. A wrong solution might be within 3° of the right solution, but is just as likely to be anywhere from zero to 360° and the bulk of those errors are easy to recognize.

Typical performance

Currently, operating with one meter baselines, with an assumed phase measurement error level of $\sigma_m=9°$ RMS due to all sources except cable bias, an unknown cable bias level of $\sigma_b=5°$ RMS, and a maximum vehicle roll/pitch of 10°, with a moving vehicle, the performance statistics are:

| | |
|---|---|
| RMS azimuth error: | 3.08 mils |
| RMS pitch error: | 5.74 mils |
| RMS roll error: | 5.76 mils |
| no solution rate: | .0091 |
| error rate: | .00005 |
| average execution time: | .24 seconds | as seen in 20,000 measurement cycles at two Hz, using random attitude and moving satellites. The method implemented with all 64-bit precision arithmetic, executes in approximately a quarter of a second, running on a twenty MHz 386 PC with a 387 math coprocessor.

With $\sigma_m=40°$, $\sigma_b=5°$, maximum roll/pitch of 10° and 35 cm baselengths, the method just barely operates with a NS of 55%, and an average execution time of about 0.6 seconds. Lowering measurement error to $\sigma_m=30°$ reduces the no-solution rate to 12%. Data taken on a ship indicates that multipath errors can be on the order of 47° RMS with an antenna down on one of the decks and with a massive metal structure overhead.

The ability of the method to determine when no solution is ascertainable has been readily verified in simulation by adding a gross error to one of the phase measurements. It is also possible to verify in actual operation by loosening a connector to an antenna.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An apparatus for determining a direction or heading in a reception environment that includes radio reflections, reception noise, antenna phase center motion, temperature-sensitive drifts and detected signal phase corruption, comprising:

a pair of GPS antennas separated by a known first physical distance that exceeds one wavelength of a radio carrier signal emitted by a GPS satellite for simultaneously receiving radio carrier signals emitted by radio transmitter in at least four corresponding GPS satellite each having a known position;

a pair of first and second phase coherent GPS correlators connected to the pair of GPS antennas and having respective first and second correlator outputs derived from said GPS satellite radio carrier signal as independently received by each of the pair of GPS antennas wherein said first and second correlator outputs include a phase difference representative of a phase difference that exists in the pair of GPS antennas for said GPS satellite radio carrier signal;

first computer means connected to the pair of first and second phase coherent GPS correlators for determining a first plurality of possible headings to a first of said GPS satellites based on a single first phase difference between said first and second correlator outputs for a first radio carrier signal from said first GPS satellite, wherein said first plurality of possible headings includes more than one possible heading due to whole cycle carrier phase ambiguities;

second computer means connected to the pair of first and second phase coherent GPS correlators for determining a second plurality of possible headings to a second of said GPS satellites based on a single second phase difference between said first and second correlator outputs for a second radio carrier signal from said second GPS satellite, wherein said second plurality of possible headings includes more than one possible heading due to whole cycle carrier phase ambiguities;

third computer means connected to the pair of first and second phase coherent GPS correlators for determining a third plurality of possible headings to a third of said GPS satellites based on a single third phase difference between said first and second correlator outputs for a third radio carrier signal from said third GPS satellite, wherein said third plurality of possible headings includes more than one possible heading due to whole cycle carrier phase ambiguities;

fourth computer means connected to the pair of first and second phase coherent GPS correlators for determining a fourth plurality of possible headings to a fourth of said GPS satellites based on a single fourth phase difference between said first and second correlator outputs for a fourth radio carrier signal from said fourth GPS satellite, wherein said fourth plurality of possible headings includes more than one possible heading due to whole cycle carrier phase ambiguities; and simultaneous heading solution computer means connected to the first through fourth computer means for matching said first through said fourth pluralities of possible headings and for identifying at least one geometry for the pair of antennas that satisfies at least three of said first through fourth plurality of possible headings and eliminating any additional geometries for the pair of antennas that satisfies at least three of said first through fourth plurality of possible headings that have a less perfect fit to said respective geometries before identifying any geometry for the pair of antennas that satisfies four of said first through fourth plurality of possible headings.

2. The apparatus of claim 1, further comprising:
a single local oscillator connected to phase coherently drive the pair of first and second GPS correlators.

3. The apparatus of claim 1, further comprising:
fifth computer means connected to the pair of first and second phase coherent GPS correlators for determining a fifth plurality of possible headings to a fifth of said GPS satellites based on a single fifth phase difference between said first and second correlator outputs for a fifth radio carrier signal from said fifth GPS satellite, wherein said fifth plurality of possible headings includes more than one possible heading due to whole cycle carrier phase ambiguities; and wherein the simultaneous heading solution computer means matches said first through said fifth pluralities of possible headings and identifies at least one geometry for the pair of antennas that satisfies at least three of said first through fifth plurality of possible headings and eliminates any additional geometries for the pair of antennas that satisfy at least three of said first through fifth plurality of possible headings that have a less perfect fit to said respective geometries before identifying any geometry for the pair of antennas that satisfies four of said first through fifth plurality of possible headings.

4. An apparatus for determining a direction or heading in a reception environment that includes radio reflections, reception noise, non-common antenna phase center motion, temperature-sensitive drifts and other corruption of detected signal phase, comprising:

a pair of GPS antennas for simultaneously receiving a plurality of radio carrier signals emitted by radio transmitters aboard a plurality of GPS satellites wherein the pair of antennas are separated by a known physical distance that exceeds one wavelength of said radio carrier signals;

a pair of first and second correlators having respective first and second correlator outputs derived from said GPS satellite radio carrier signals as received by each of the pair of GPS antennas;

means for coherently driving the pair of first and second correlators and for obtaining a phase difference that exists between said first and second correlator outputs responsive to said GPS satellite radio carrier signals and said separation of the pair of GPS antennas;

first computer means connected to the pair of first and second phase coherent GPS correlators for determining a plurality of possible unambiguous carrier phase differences between said first and second correlator outputs for each respectively received GPS satellite radio carrier signal, wherein all the possible unambiguous carrier phase differences of any given received signal include a single common whole cycle ambiguity integer;

second computer means connected to the pair of first and second phase coherent GPS correlators for determining a unique combination of unambiguous carrier phase differences, from among all possible combinations inclusive of all said received GPS satellite radio carrier signals, having a superior heading solution fit with said unambiguous carrier phase differences compared to all other possible combinations likewise inclusive of all said received GPS satellite radio carrier signals; and third computer means connected to the pair of first and second phase coherent GPS correlators for determining direction or heading based on said unambiguous carrier phase differences of a best-fit combination inclusive of all said received GPS satellite radio carrier signals.

5. The apparatus of claim 4, wherein:

the first, second and third computer means each include means to determine combinations of unambiguous carrier phase differences that exclude one or more of said received GPS satellite radio carrier signals, and in cases where said exclusive combination exhibits a weighted-fit error that exceeds another combination error inclusive of all said received GPS satellite radio carrier signals, the first, second and third computer means avoid evaluating of all other combinations, inclusive or exclusive, that contain said present exclusive combination as a smaller part, wherein the detection of an exclusive combination with weighted-fit error that exceeds a predetermined maximum value does not further process larger combinations that contain said present exclusive combination.

6. A computer-implemented method for determining a navigational heading in a reception environment that includes radio reflections, reception noise, antenna phase center motion, temperature-sensitive drifts and detected signal phase corruption, the method comprising the steps of:

inputting phase measurement data from a set of GPS correlators connected to a trio of GPS antennas mounted to a vehicle and separated from one another by more than one GPS carrier frequency wavelength and having a phase output measurement subject to whole-cycle carrier phase ambiguity;

calculating in a computer connected to said GPS correlators a maximum likelihood estimation (MLE) optimization procedure expressible in computer program pseudocode as:

$$\hat{x}_0 = 0$$
$$U_0 = 0$$
$$W_{best} = W_{max}$$
for $n_1$ = from$_1$ ... to$_1$ do
    begin
        $y_1 = (\theta_1 + n_1) - H_1\hat{x}_0$
        $U_1 = U_0 + y_1^2/v_1$
        if ($U_1 < W_{best}$) then
        begin
            $\hat{x}_1 = \hat{x}_0 + K_1 y_1$
            for $n_2$ = from$_2$ ... to$_2$ do
            begin
                $y_2 = (\theta_2 + n_2) - H_2\hat{x}_1$
                $U_2 = U_1 + y_2^2/v_2$
                if ($U_2 < W_{best}$) then
                begin
                      $\hat{x}_2 = \hat{x}_1 + K_2 y_2$
                      .

for $n_m$ = from$_m$ ... to$_m$ do
                begin
                    $y_m = (\theta_m + n_m) - H_m\hat{x}_{m-1}$
                    $U_m = U_{m-1} + y_m^2/v_m$
                    if ($U_m < W_{best}$) then
                    begin
                      $X_{best} = \hat{x}_{m-1} + K_m y_m$
                      $n_{best} = (n_1, n_2, \ldots, n_m)$
                      $W_{best} = U_m$
                    end
                end
            end
        end
    end where $\theta_i$ are first-difference carrier phase measurements derived from said phase coherent GPS correlators, $U_i$ is a weighted-fit error that appears at a stage "i" of a tree, $W_{best}$ is a best weighted-fit error, from$_1$...to$_1$, from$_2$...to$_2$ through from$_m$...to$_m$ are the outer limits of whole cycle carrier ambiguities, $H_i = [LOS_i | 1]$ is an observation matrix containing a line-of-sight unit vector that points into a direction of a GPS signal arrival, and where $v_i$ and $K_i$ are pre-computed, wherein a final integer combination is selected on the basis of a best fit with the measured carrier phase, as indicated by a weighted-fit error, and $X_{best}$, $n_{best}$, and $W_{best}$ represent a desired optimum antenna position, an integer combination and an associated weighted-fit error;

determining a range of integers that are possible for a first baseline drawn between two of said GPS antennas, given only the known constraints on vehicle roll and pitch, wherein only a small range of integers is possible if said vehicle cannot roll or pitch significantly relative to any GPS satellites that are substantially vertically overhead;

processing all phase measurements from a shortest baseline between said GPS antennas to determine a first-antenna position, searching a range of integers determined in the previous step using a four-state filter that solves in geodetic coordinates for a single antenna position and a single cable bias;

verifying that antenna vertical coordinates are within a limit set by a maximum vehicle roll and pitch for integer combinations that survive the previous step;

verifying that the baselength computed from said antenna coordinates matches a known baselength to within a noise tolerance;

using said known baselength as a reference measurement and normalizing an antenna position vector to unit length to serve as Kalman observation matrix H, and assigning a measurement variance R to cover a non-linearity that results from H being slightly perturbed by noise in the phase measurements from said GPS correlators;

if said integer combination and antenna coordinate survive to this step, calculating an arc of coordinates that are possible for a second antenna, assuming that said first antenna coordinate is true, and determining a range of integers that are possible for said second baseline, while adding a margin to allow for a phase measurement noise;

processing all phase measurements of said second baseline to determine a second antenna position;

verifying that a surviving one of said antenna vertical coordinates is within a limit set by a maximum vehicle roll and pitch;

verifying that a baselength computed from a second antenna coordinates matches a known baselength to within a noise tolerance;

verifying that an included angle relative to a first antenna agrees with a known angle q to within a noise tolerance;

using a known baselength of said second baseline as a very accurate measurement, a measurement variance R is assigned to cover a non-linearity, accumulating U with this measurement and abandoning a search at any step where U exceeds $W_{best}$;

computing a Y-axis of a reference antenna coordinate system by normalizing a second antenna position vector, which yields a vector of unit length, in geodetic coordinates, that points along the roll axis of an antenna coordinate system, and determines two degrees of freedom of this coordinate frame, wherein the other antenna position determines a plane containing both antenna baselines and a Z-axis of said antenna coordinate system is defined to be normal to this plane, with a polarity chosen in such a way that the Z-axis always points somewhere toward the sky;

determining whether any GPS satellite line-of-sight vectors lie below said X-Y plane, wherein valid phase measurements are not possible for signal direction of arrival that is below the antenna ground plane and where a cutoff angle of $-5°$ is used to allow for noise in a frame orientation, and to allow a margin for low-elevation gain;

mechanizing a five-state filter for small roll, pitch and yaw angles that rotate this frame into an antenna orientation that yields a closest agreement with measured phase, wherein closest agreement is equivalent to minimum weighted-fit error W using eight phase measurements;

comparing W from with a best W, if the new W is better, then updating $W_{best}$ and saving this set of integers and associated attitude as a MLE optimum;

continuing to search until all integer combinations have been exhausted; and outputting a value representing the relative attitude of said baselines drawn among said GPS antennas.

7. The method of claim 6, wherein:

said $v_i$ and $K_i$ are pre-computed in said computer in a computer-implemented method expressible in computer program pseudocode as:

```
x̂₀ = 0
P₀ = diag (∞, ∞, ∞, R_b)
for i = 1 ... m do
begin
    y_i = (θ_1 + n_i) − H_i x̂_{i−1}
    v_i = H_i P_{i−1} H_i^T + R_i
    K_i = P_{i−1} H_i^T / v_i
    x̂ = x̂_{i−1} + K_i y_i
    P_i = (I − K_i H_i) P_{i−1}
end.
```

* * * * *